(12) United States Patent
Inada et al.

(10) Patent No.: US 11,262,115 B2
(45) Date of Patent: Mar. 1, 2022

(54) COOLING APPARATUS

(71) Applicant: Daikin Industries, LTD., Osaka (JP)

(72) Inventors: Ryozo Inada, Osaka (JP); Chiharu Tomita, Osaka (JP); Kazuhide Mizutani, Osaka (JP); Toshiro Ino, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 39 days.

(21) Appl. No.: 16/492,798

(22) PCT Filed: Apr. 13, 2018

(86) PCT No.: PCT/JP2018/015565
§ 371 (c)(1),
(2) Date: Sep. 10, 2019

(87) PCT Pub. No.: WO2018/193990
PCT Pub. Date: Oct. 25, 2018

(65) Prior Publication Data
US 2020/0056819 A1 Feb. 20, 2020

(30) Foreign Application Priority Data
Apr. 21, 2017 (JP) .............................. JP2017-084873

(51) Int. Cl.
*F25B 49/00* (2006.01)
*F25B 21/00* (2006.01)
*F25D 11/02* (2006.01)

(52) U.S. Cl.
CPC .............. *F25B 49/00* (2013.01); *F25B 21/00* (2013.01); *F25D 11/02* (2013.01); *F25B 2321/001* (2013.01); *F25B 2321/0023* (2013.01)

(58) Field of Classification Search
CPC .... F25B 49/00; F25B 21/00; F25B 2321/001; F25B 2321/0023; F25D 11/02; A23L 3/01; A23L 3/36; Y02B 30/00
(Continued)

(56) References Cited

U.S. PATENT DOCUMENTS

2006/0112699 A1   6/2006   Sato et al.

FOREIGN PATENT DOCUMENTS

EP    2 322 883 A1    5/2011
JP    2001-245645 A   9/2001
(Continued)

OTHER PUBLICATIONS

International Preliminary Report on Patentability and the Written Opinion of the International Searching Authority for International Application No. PCT/JP2018/015565, dated Oct. 31, 2019.
(Continued)

*Primary Examiner* — Ana M Vazquez
(74) *Attorney, Agent, or Firm* — Birch, Stewart, Kolasch & Birch, LLP

(57) ABSTRACT

A cooling apparatus that cools a cooling target object in a state in which an electromagnetic field or an electric field acts on the cooling target object is provided. The cooling apparatus includes a refrigeration machine to cool a cooling target object, an electromagnetic wave irradiation device to generate an electromagnetic field which acts on the cooling target object, a controller to control operations of the refrigeration machine and the electromagnetic wave irradiation device and perform a subcooling operation of cooling the cooling target object by using the refrigeration machine in a state in which the electromagnetic field is generated, and a temperature sensor to measure a temperature of the cooling target object. In the subcooling operation, the controller controls the intensity of the electromagnetic field generated
(Continued)

by the electromagnetic wave irradiation device in accordance with the temperature measured by the temperature sensor.

5 Claims, 8 Drawing Sheets

(58) Field of Classification Search
USPC .............................................. 62/3.1
See application file for complete search history.

(56) References Cited

FOREIGN PATENT DOCUMENTS

| JP | 2009-229037 A | 10/2009 | |
|----|----|----|----|
| JP | 2009229037 A * | 10/2009 | ............. F25D 23/12 |
| WO | WO 2008/004762 A1 | 1/2008 | |
| WO | WO 2011/152047 A1 | 12/2011 | |
| WO | WO-2011152047 A1 * | 12/2011 | ............. F25D 23/12 |

OTHER PUBLICATIONS

Extended European Search Report dated Dec. 8, 2020 in corresponding European Application No. 18787573.7.

\* cited by examiner

COOLING APPARATUS

TECHNICAL FIELD

The present invention relates to a cooling apparatus which cools an cooling target object in a subcooling zone by cooling the cooling target object in a state in which an electromagnetic field or an electric field acts on the cooling target object.

BACKGROUND ART

In general, when an object, such as food, is frozen, moisture is frozen and ice crystals are generated, and therefore, cellular tissue constituting the object is damaged. Such a damage of the cellular tissue causes concentration at a time of freezing or drip at a time of thawing resulting in deterioration of quality of the object. The damage of cellular tissue of an object becomes more significant as the object slowly passes through a temperature zone referred to as a maximum ice crystal production zone where ice crystals most easily grow larger at a time of freezing of the object.

Patent Literature 1 (Japanese Unexamined Patent Application Publication No. 2001-245645) describes a cooling apparatus which cools an object (object to be cooled) while making the object generate internal heat by irradiating the object with an electromagnetic wave (in a state in which an electromagnetic field acts on the object) so that the object passes through the maximum ice crystal production zone in a short time and damage of cell tissue of the object is suppressed. Such a cooling apparatus may produce a subcooling state of an object. If such a cooling apparatus reduces a temperature of an object to a temperature lower than the maximum ice cryptal production zone in the subcooling state, and thereafter, the internal heat generation of the object caused by the electromagnetic wave is stopped, a period of time for the object freezing in the maximum ice crystal production zone may be reduced. Furthermore, a cooling apparatus employing another method, that is, a method for cooling an object in a subcooling zone in a state in which an electric field (an electrostatic field) acts on the object, is also used.

SUMMARY OF THE INVENTION

Technical Problem

A cooling apparatus which cools an object (object to be cooled) in a state in which an electromagnetic field or an electric field acts on the object uses energy for operation other than cooling, and therefore, intensity of the electromagnetic field or the electric field is preferably reduced as much as possible in terms of efficiency.

As a method for setting intensity of an electromagnetic field or an electric field, a certain single value may be set as the intensity, for example. The intensity of the electromagnetic field or the electric field is preferably as small as possible as described above. However, if the intensity of the electromagnetic field or the electric field is too small, the object does not enter the subcooling state and there is a possibility that the object is frozen in the maximum ice crystal production zone. Therefore, a comparatively large value needs to be employed with a safety margin, as the intensity of the electromagnetic field or the electric field, taking differences of characteristics among types of object into consideration.

As another setting method, instead of employing a single value for the intensity of the electromagnetic field or the electric field, different appropriate values may be set for different types of object in advance by using samples of cooling target objects. This configuration may effectively cause the subcooling state of the object (while the intensity of the electromagnetic field or the electric field is suppressed) as compared with a case where a constant intensity is employed irrespective of types of cooling target object. However, in a case where objects to be cooled by the cooling apparatus are not specified, it is actually difficult to select appropriate intensities of an electromagnetic field or an electric field for all potential objects. Furthermore, for example, even when the same type of objects, individual objects may have actually different components respectively, and thus it is not necessarily the case that the intensity of the electromagnetic field or the electric field which is appropriate for a sample is also appropriate for an actual cooling target object. Therefore, a somewhat large value with a safety margin needs to be employed as the intensity of the electromagnetic field or the electric field, and therefore, there is a room for improvement in terms of efficiency.

The present invention is to provide a cooling apparatus that cools a cooling target object in a state in which an electromagnetic field or an electric field acts on the object and that is capable of efficiently causing a subcooling state of the object.

Solution to Problem

A cooling apparatus according to a first aspect of the present invention includes a refrigeration machine, a generator, a controller, and a temperature sensor. The refrigeration machine cools a cooling target object. The generator generates an electromagnetic field or an electric field which acts on the cooling target object. Intensity of the electromagnetic field or the electric field generated by the generator is variable. The controller controls operations of the refrigeration machine and the generator and performs a cooling operation of cooling the cooling target object by using the refrigeration machine in a state in which the electromagnetic field or the electric field is generated. The temperature sensor measures a temperature of the cooling target object. In the cooling operation, the controller controls the intensity of the electromagnetic field or the electric field generated by the generator in accordance with the temperature measured by the temperature sensor.

The cooling apparatus according to the first aspect does not determine the intensity of the electromagnetic field or the electric field to be generated in advance but controls the intensity of the electromagnetic field or the electric field in accordance with the temperature of the cooling target object which is being cooled. Therefore, the cooling apparatus may produce a subcooling state with high efficiency and less power consumption for any type of cooling target object.

A cooling apparatus according to a second aspect of the present invention is the cooling apparatus according to the first aspect, and, in the cooling operation, the controller controls the intensity of the electromagnetic field or the electric field in accordance with a change rate of the temperature.

The cooling apparatus according to the second aspect appropriately controls the intensity of the electromagnetic field or the electric field in accordance with the change rate of the temperature of the cooling target object that is being cooled, which can be easily used as an index for determining whether the subcooling state is realized. Therefore, the cooling apparatus can produce the subcooling state of the cooling target object with high efficiency and less power consumption.

A cooling apparatus according to a third aspect of the present invention is the cooling apparatus according to the second aspect, and, in the cooling operation, the controller detects a sign indicating that the cooling target object is to enter the frozen state in accordance with the change rate of the temperature and increases the intensity of the electromagnetic field or the electric field when the sign is detected.

The cooling apparatus according to the third aspect increases, when the sign indicating that the cooling target object is to be frozen is detected, the intensity of the electromagnetic field or the electric field so that the cooling target object is not frozen. Therefore, in the cooling apparatus, the cooling target object is prevented from being frozen in the maximum ice crystal production zone that is out of the subcooling state.

Note that, when the cooling target object is frozen, the temperature of the cooling target object normally exhibits one of the following changes.
1) A temperature of the cooling target object is substantially constant since heat is used for a phase change.
2) A temperature of the cooling target object rises when a state of the cooling target object is changed from the subcooling state to the frozen state.

Therefore, the controller preferably detects the sign indicating that the cooling target object is to be frozen by detecting the temperature change of the cooling target object.

A cooling apparatus according to a fourth aspect of the present invention is one of the cooling apparatuses according to the first to third aspects, and, in the cooling operation, the controller stops generation of the electromagnetic field or the electric field by the generator while continuing cooling by the refrigeration machine after the cooling target object is cooled such that the temperature detected by the temperature sensor is lowered to a certain temperature which is lower than a lower limit value of a maximum ice crystal production zone.

The cooling apparatus according to the fourth aspect stops generation of the electromagnetic field or the electric field but continues only the cooling after the cooling target object is cooled to the certain temperature which is lower than the lower limit value of the maximum ice crystal production zone. Therefore, a period of time for the cooling target object freezing in the maximum ice crystal production zone is reduced and the cooling target object may be frozen while deterioration of quality of the cooling target object is reduced.

A cooling apparatus according to a fifth aspect of the present invention is one of the cooling apparatuses according to any one of the first to fourth aspects, and the controller starts the cooling operation in a state in which the intensity of the electromagnetic field or the electric field generated by the generator is set to a minimum intensity.

The cooling apparatus according to the fifth aspect starts the cooling operation, for cooling the cooling target object in the subcooling state by causing the electromagnetic field or the electric field to act on the cooling target object, in a state in which the intensity of the electromagnetic field or the electric field is reduced to the minimum intensity. Therefore, the cooling apparatus easily produces the subcooling state of the cooling target object with high efficiency and less power consumption.

A cooling apparatus according to a sixth aspect of the present invention is one of the cooling apparatuses according to any one of the first to fifth aspects, and the generator generates the electromagnetic field. The controller increases cooling capacity of the refrigeration machine and/or reduces the intensity of the electromagnetic field generated by the generator when an amount of internal heat generation of the cooling target object generated by the electromagnetic field is determined to be larger than the cooling capacity of the refrigeration machine.

In the cooling apparatus according to the sixth aspect, the cooling capacity of the refrigeration machine is increased and/or the intensity of the electromagnetic field is reduced when the amount of heat of the internal heat generation generated by the electromagnetic field is larger than the cooling capacity of the refrigeration machine. Therefore, the cooling target object may be cooled without increasing the temperature of the cooling target object.

A cooling apparatus according to a seventh aspect of the present invention is one of the cooling apparatuses according to any one of the first to fifth aspects, and the generator generates the electromagnetic field. A frequency of the electromagnetic field generated by the generator is variable. The controller at least controls the operation of the generator to perform a preliminary operation to determine a frequency of the electromagnetic field to be generated in the cooling operation.

In the cooling apparatus according to the seventh aspect, the frequency of the electromagnetic field to be generated is not determined in advance for each cooling target object, but the preliminary operation is performed to determine the frequency of the electromagnetic field to be generated using the cooling target object itself. Therefore, the cooling operation may be performed using the electromagnetic field of the frequency which efficiently causes internal heat generation in the cooling target object for any type of cooling target object.

Advantageous Effects of Invention

The cooling apparatus according to the first aspect of the present invention does not determine the intensity of the electromagnetic field or the electric field to be generated in advance and controls the intensity of the electromagnetic field or the electric field in accordance with the temperature of the cooling target object which is being cooled. Therefore, the cooling apparatus may produce a subcooling state with high efficiency and less power consumption for any type of cooling target object.

The cooling apparatus according to the second aspect of the present invention may produce the subcooling state of the cooling target object with high efficiency and less power consumption.

The cooling apparatus according to the third aspect of the present invention can prevent the cooling target object from being frozen in the maximum ice crystal production zone that is out of the subcooling state.

The cooling apparatus according to the fourth aspect of the present invention may reduce a period of time for the cooling target object freezing in the maximum ice crystal production zone and freeze the cooling target object while deterioration of quality of the cooling target object is reduced.

The cooling apparatus according to the fifth aspect of the present invention easily produces the subcooling state of the cooling target object with high efficiency and less power consumption.

The cooling apparatus according to the sixth aspect of the present invention may cool the cooling target object without increasing the temperature of the cooling target object.

The cooling apparatus according to the seventh aspect of the present invention may perform the cooling operation using the electromagnetic field of a frequency which efficiently causes internal heat generation in the cooling target object for any type of cooling target object.

DESCRIPTION OF EMBODIMENTS

Embodiments of a cooling apparatus according to the present invention will be described with reference to the accompanying drawings.

Note that the embodiments below are merely concrete examples of the present invention and do not limit the technical scope of the present invention. The embodiments below may be appropriately changed without departing from the scope of the present invention.

First Embodiment (1) Overall Configuration

A cooling apparatus 100 of a first embodiment of the present invention cools a cooling target object M, such as food. The cooling apparatus 100 cools the cooling target object M while irradiating the cooling target object M with an electromagnetic wave so as to cool the cooling target object M in a subcooling zone. In other words, the cooling apparatus 100 cools the cooling target object M while an electromagnetic field acts on the cooling target object M so as to cool the cooling target object M in the subcooling zone. Note that the expression "the cooling target object M is irradiated with an electromagnetic wave" means similarly to the expression "an electromagnetic field acts on the cooling target object M".

For example, the cooling apparatus 100 is used for a large freezer for business use. However, the present invention is not limited to this and the cooling apparatus 100 may be used for a freezer container for transportation or a refrigerator for home use.

Figure 6A:
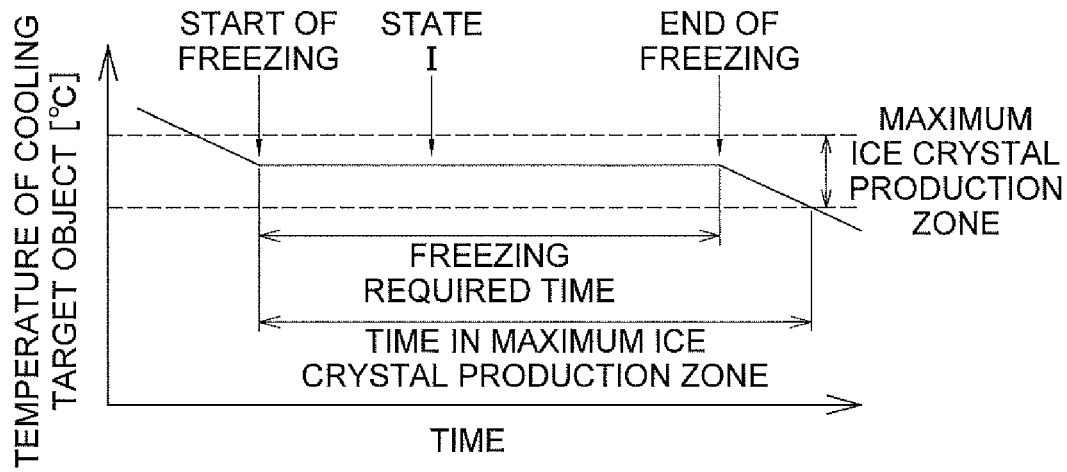
FIG. 6 includes diagrams illustrating a difference between a change in temperature of a cooling target object with time when the cooling target object is cooled without irradiating the object with an electromagnetic wave and a change in temperature of the cooling target object with time when the cooling target object is cooled by the cooling apparatus of FIG. 1, where (a) of FIG. 6 is a diagram schematically illustrating the change in temperature of the cooling target object when the cooling target object is cooled without irradiating the object with an electromagnetic wave and (b) of FIG. 6 is a diagram schematically illustrating a change in temperature of the cooling target object with time when the cooling target object is cooled by the cooling apparatus of FIG. 1.
Figure 6B:
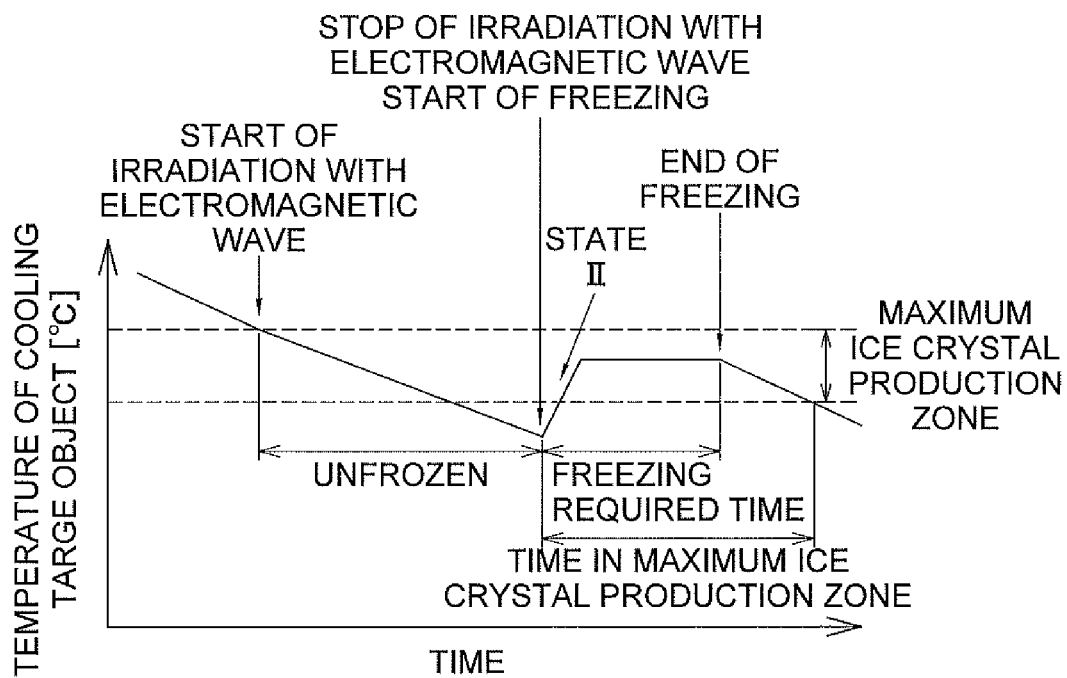
Figure 7:
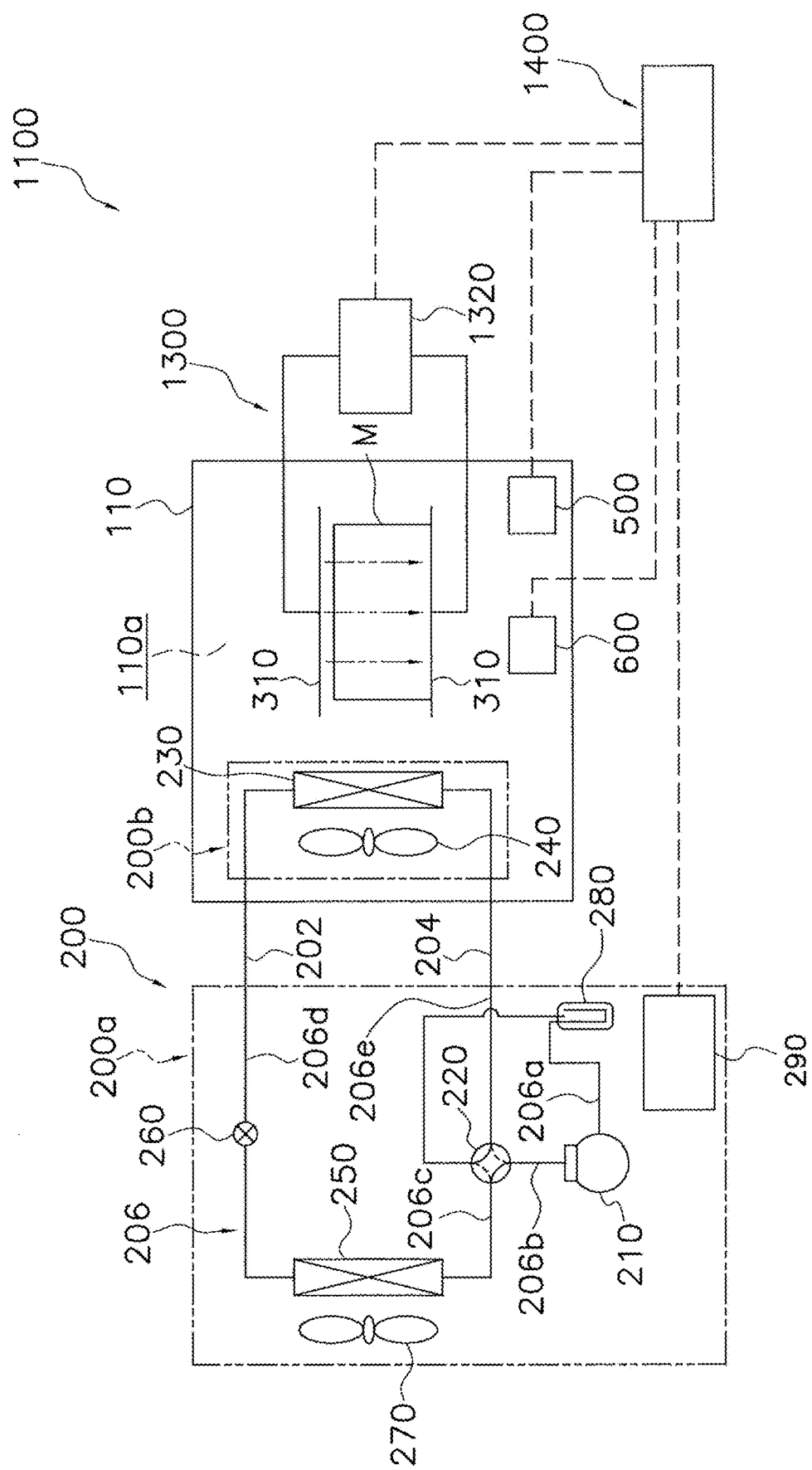
FIG. 7 is a diagram schematically illustrating an example of configuration of a cooling apparatus according to a second embodiment of the present invention.

First, a difference between a time change in a temperature of an cooling target object M when the cooling target object M is cooled without irradiating the cooling target object M with the electromagnetic wave in conventional methods and a time change in a temperature of the cooling target object M when the cooling target object M is cooled in the subcooling zone by irradiating the cooling target object M with the electromagnetic wave (by causing an electromagnetic field to act on the cooling target object M) using the cooling apparatus 100 will be described with reference to FIG. 6. FIG. 6(a) is a diagram schematically illustrating the time change in a temperature of the cooling target object M when the cooling target object M is cooled without irradiating the cooling target object M with the electromagnetic wave. FIG. 6(b) is a diagram schematically illustrating the time change in a temperature of the cooling target object M when the cooling target object M is cooled using the cooling apparatus 100.

In the case where the cooling target object M is cooled without irradiating the object M with an electromagnetic wave, when a temperature of the cooling target object M reaches its freezing point (in many cases, a certain temperature in a maximum ice crystal production zone (−5 to −1° C.)), the cooling target object M starts freezing. When the cooling target object M starts freezing, most cooling capacity of a refrigeration machine is used for phase transition of the cooling target object M. Therefore, after the start of freezing, the temperature of the cooling target object M is barely changed until completion of the freezing. When the freezing is completed, the temperature of the cooling target object M falls again (refer to FIG. 6(a)).

On the other hand, in the case where the cooling target object M is cooled using the cooling apparatus 100, the cooling target object M is cooled in the subcooling zone while irradiating the cooling target object M with the electromagnetic wave. Therefore, the cooling target object M does not freeze and the temperature thereof falls even when reaching the freezing point or the maximum ice crystal production zone. When the temperature of the cooling target object M reaches a certain temperature, and then, the cooling apparatus 100 stops irradiation with the electromagnetic wave, the cooling target object M starts freezing and the temperature of the cooling target object M is once increased to the freezing point. The temperature of the cooling target object M is barely changed until the freezing is completed, and when the freezing is completed, the temperature of the cooling target object M falls again (refer to FIG. 6(b)).

When the cooling target object M is cooled using the cooling apparatus 100, the following effect is obtained. That is, a period of time required for freezing (a period of time from the start of the freezing to the end of the freezing) may be reduced when compared with the case where the cooling target object M is cooled without irradiating the cooling target object M with the electromagnetic wave. Furthermore, in the case where the cooling target object M is cooled using the cooling apparatus 100, the following effect is obtained. That is, a time in the maximum ice crystal production zone (a period of time from when the freezing is started to when the freezing is terminated and reaching a lower limit value of the maximum ice crystal production zone) may be reduced when compared with the case where the cooling target object M is cooled without irradiating the cooling target object M with the electromagnetic wave. Consequently, generation of ice cryptal in the cooling target object M is reduced during the freezing, and accordingly, deterioration of quality of the object may be suppressed. Operation of the cooling apparatus 100 which realizes such a change in temperature of the cooling target object M will be described hereinafter.

A configuration of the cooling apparatus 100 will be described.

Figure 1:
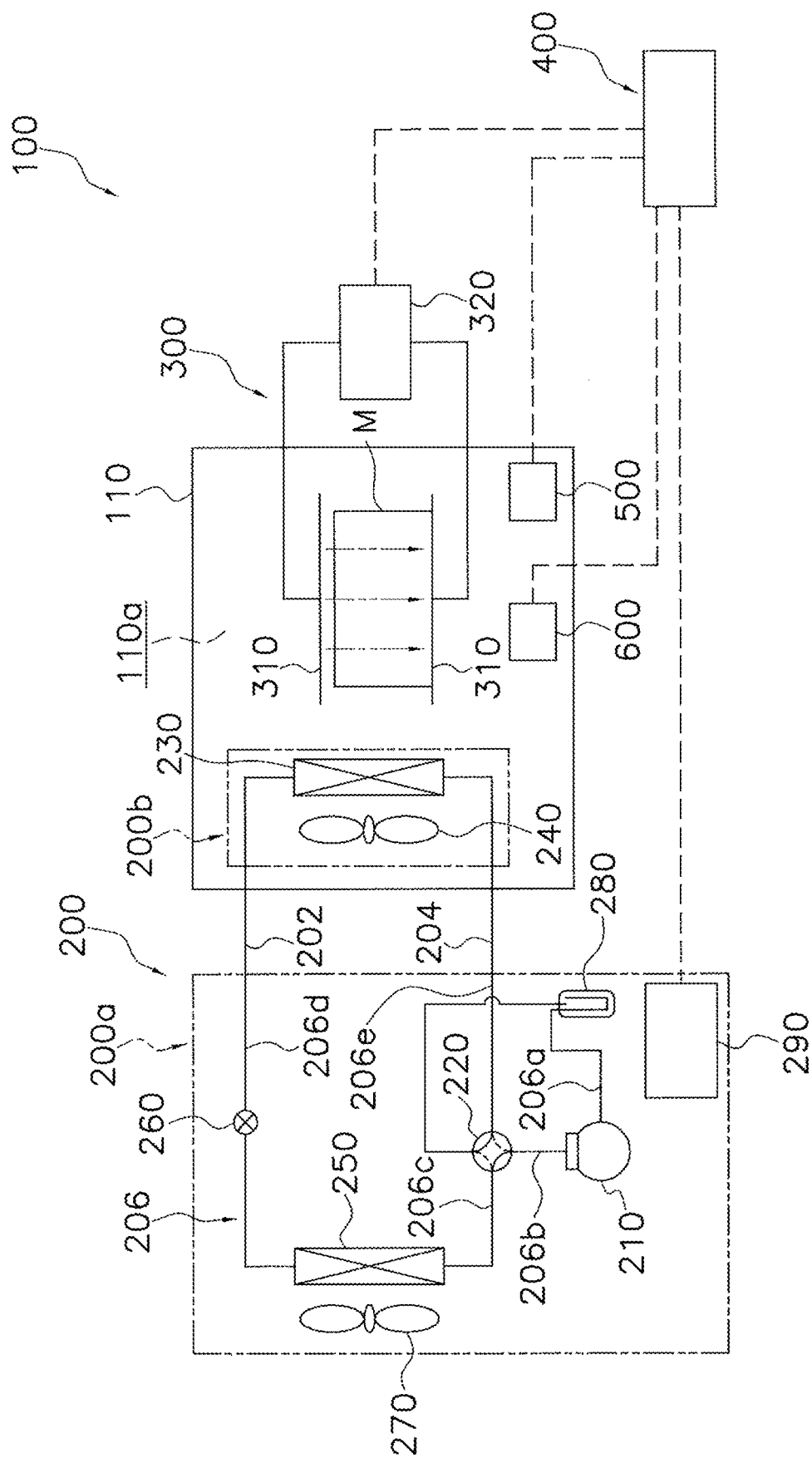
FIG. 1 is a diagram schematically illustrating an example of configuration of a cooling apparatus according to a first embodiment of the present invention.
Figure 2:
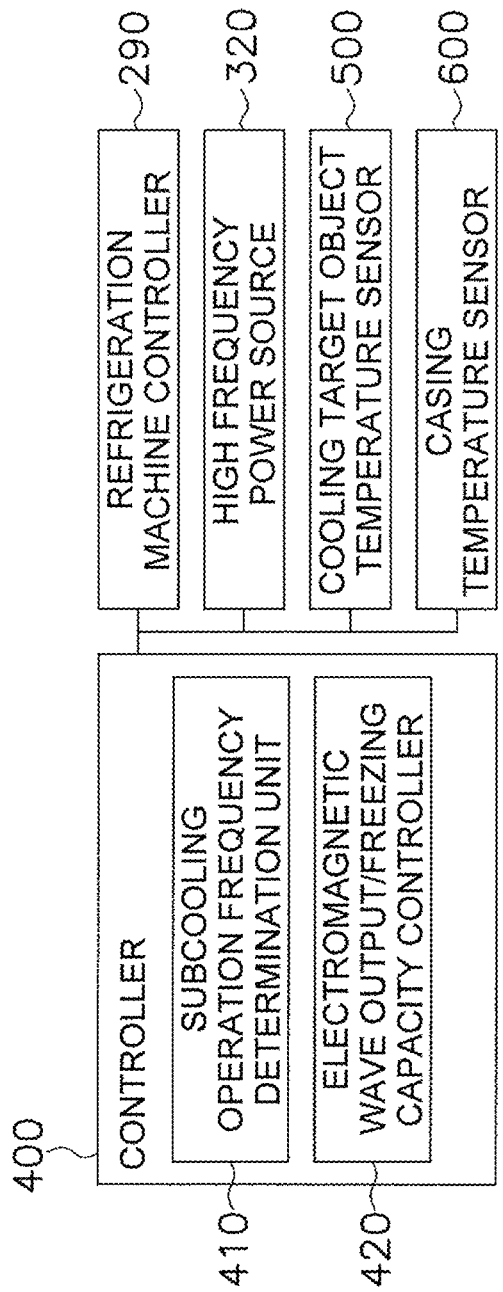
FIG. 2 is a block diagram illustrating a controller of the cooling apparatus of FIG. 1.

The cooling apparatus 100 mainly includes a casing 110, a refrigeration machine 200, an electromagnetic wave irradiation device 300, a controller 400, a cooling target object temperature sensor 500, and a casing temperature sensor 600 (refer to FIGS. 1 and 2).

The casing 110 is a case defining a cooling space 110a therein. The cooling space 110a accommodates and cools the cooling target object M. The cooling space 110a is surrounded by walls of the casing 110 (including a ceiling surface, side surfaces, and a bottom surface, not illustrated). The walls of the casing 110 are insulated by insulating material. The casing 110 has a door (not illustrated) used to introduce the cooling target object M into the cooling space 110a and introduce the cooling target object M from the cooling space 110a.

The refrigeration machine 200 cools the cooling space 110a inside the casing 110 using a vapor compression refrigeration cycle. The refrigeration machine 200 includes a casing outside unit 200a serving as a heat source side unit and a casing inside unit 200b serving as a use side unit (refer to FIG. 1). The casing outside unit 200a and the casing inside unit 200b are connected to each other through a liquid-refrigerant connection pipe 202 and a gas-refrigerant connection pipe 204 (refer to FIG. 1). The casing inside unit 200b blows the cooling space 110a with cold air so as to reduce a temperature in the cooling space 110a, and cool the cooling target object M in the cooling space 110a.

The electromagnetic wave irradiation device 300 is an example of a generator which generates an electromagnetic field which acts on the cooling target object M. It is possible to cool the cooling target object M in the subcooling zone by cooling the cooling target object M with the refrigeration machine 200 while applying the electromagnetic field on the cooling target object M with the electromagnetic wave irradiation device 300. Here, the electromagnetic wave irradiation device 300 irradiates the cooling target object M with the electromagnetic wave so that internal heat generation of the cooling target object M is caused and thus makes it possible to cool the cooling target object M in the subcooling zone. The electromagnetic wave irradiation device 300 performs dielectric heating on the cooling target object M by irradiating the cooling target object M with an electromagnetic wave of a high frequency. A pair of electrodes 310 used to irradiate the cooling target object M with an electromagnetic wave is disposed inside the cooling space 110a (refer to FIG. 1). The cooling target object M by the cooling apparatus 100 is disposed between the pair of electrodes 310 so as to be irradiated with the electromagnetic wave. Note that the cooling target object M may not be in contact with the electrodes 310. Furthermore, a stand on which the cooling target object M is to be mounted and which is formed of material allowing the electromagnetic wave to pass may be disposed between the cooling target object M and one of the electrodes 310, for example.

In the electromagnetic wave irradiation device 300, a frequency of an electromagnetic wave to be irradiated (a frequency of a generated electromagnetic field) is variable. The electromagnetic wave irradiation device 300 may change the frequency of the electromagnetic wave to be irradiated, within a predetermined settable frequency range (in a range between a minimum frequency fmin and a maximum frequency fmax). The settable frequency range includes regions of a medium wave (300 kHz to 3 MHz), a short wave (3 to 30 MHz), and an ultrashort wave (30 to 300 MHz), for example. The settable frequency range is, for example, a range from 1 MHz to 50 MHz but is not limited to. It is preferable that the settable frequency range is designed such that the frequency appropriate for high frequency dielectric heating to be performed on the cooling target object by the cooling apparatus 100 is included in this range. Note that the electromagnetic wave irradiation device 300 may set an arbitrary value (or consecutively change a value) within the settable frequency range as a frequency value, or may set only a plurality of discrete values within the settable frequency range as the frequency values.

Furthermore, intensity of a generated electromagnetic field is variable in the electromagnetic wave irradiation device 300. In other words, an output (wattage) of an electromagnetic wave to be irradiated is variable in the electromagnetic wave irradiation device 300. The electromagnetic wave irradiation device 300 may change the output of the electromagnetic wave to be irradiated, within a predetermined settable output range (in a range between a minimum output Smin and a maximum output Smax). When the output of the electromagnetic wave is set to the minimum output Smin, intensity of the electromagnetic field is set to minimum intensity. When the output of the electromagnetic wave is set to the maximum output Smax, intensity of the electromagnetic field is set to maximum intensity. The settable output range is designed as a range appropriate for subcooling of a cooling target object by the cooling apparatus 100. For example, an upper limit value (the maximum output Smax) in the settable output range is preferably set such that the cooling target object M is not frozen even if a temperature of the cooling target object M falls to the maximum ice crystal production zone when the refrigeration machine 200 operates with a predetermined cooling capacity and the electromagnetic wave irradiation device 300 irradiates the cooling target object M with the electromagnetic wave at the maximum output Smax. Furthermore, for example, a lower limit value (the minimum output Smin) in the settable output range is preferably set such that a temperature of the cooling target object M falls when a temperature of the cooling target object M is higher than an upper limit value of the maximum ice crystal production zone, the refrigeration machine 200 operates with a predetermined cooling capacity, and the electromagnetic wave irradiation device 300 irradiates the cooling target object M with the electromagnetic wave at the minimum output Smin. In other words, it is preferable that the minimum output Smin is set such that an amount of generated heat inside the cooling target object M obtained at the time of irradiation with the electromagnetic wave of the maximum output Smin does not exceed the predetermined cooling capacity of the refrigeration machine 200. Note that the electromagnetic wave irradiation device 300 may set an arbitrary value (or consecutively change a value) within the settable output range as an output value, or may set only a plurality of discrete values within the settable output range as the output values.

The controller 400 controls operations of the refrigeration machine 200 and the electromagnetic wave irradiation device 300. The controller 400 performs three types of operation (including a preliminary operation, a normal cooling operation, and a subcooling operation) by controlling the operations of the refrigeration machine 200 and the electromagnetic wave irradiation device 300. In other words, the controller 400 causes the cooling apparatus 100 to execute the three types of operation (including the preliminary operation, the normal cooling operation, and the subcooling operation) by controlling the operations of the refrigeration machine 200 and the electromagnetic wave irradiation device 300. Note that the cooling apparatus 100 may execute other types of operation.

The preliminary operation is performed to determine a subcooling operation frequency f1. The subcooling operation frequency f1 is a frequency of an electromagnetic wave which is irradiated from the electromagnetic wave irradiation device 300 to the cooling target object M at a time of the subcooling operation described below. The preliminary operation does not aim for cooling of the cooling target object M.

Specifically, the controller 400 operates the electromagnetic wave irradiation device 300 without operating the refrigeration machine 200 in the preliminary operation. The controller 400 changes the frequency of the electromagnetic wave which is irradiated from the electromagnetic wave irradiation device 300 and controls the electromagnetic wave irradiation device 300 such that the cooling target object M is irradiated with electromagnetic waves of various frequencies in the preliminary operation. The controller 400 then determines, in the preliminary operation, the subcooling operation frequency f1 which is a frequency of the electromagnetic wave irradiated from the electromagnetic wave irradiation device 300 to the cooling target object M in the subcooling operation. The determination of the subcooling operation frequency f1 performed by the controller 400 will be described later.

In the normal cooling operation, the refrigeration machine 200 is operated to cool the cooling target object M in a state in which the electromagnetic wave irradiation device 300 is stopped.

The subcooling operation is an example of a cooling operation. The controller 400 performs the subcooling operation after the preliminary operation (that is, after the subcooling operation frequency f1 is determined). In the subcooling operation, the controller 400 controls the operations of the refrigeration machine 200 and the electromagnetic wave irradiation device 300 such that the refrigeration machine 200 cools the cooling target object M in a state in which the electromagnetic wave irradiation device 300 irradiates the cooling target object M with the electromagnetic wave (in a state in which the electromagnetic wave irradiation device 300 generates an electromagnetic field). Note that the controller 400 controls the electromagnetic wave irradiation device 300, in the subcooling operation, so that the electromagnetic wave irradiation device 300 irradiates the electromagnetic wave of the subcooling operation frequency f1 determined in the preliminary operation. The cooling apparatus 100 performs the subcooling operation mainly for the purpose of cooling the cooling target object M in the subcooling zone.

In the subcooling operation, the controller 400 controls the output of the electromagnetic wave irradiated from the electromagnetic wave irradiation device 300 to the cooling target object M in accordance with a temperature of the cooling target object M which is measured by the cooling target object temperature sensor 500 described below. In other words, the controller 400 controls the intensity of the electromagnetic field generated by the electromagnetic wave irradiation device 300 in accordance with the temperature of the cooling target object M which is measured by the cooling target object temperature sensor 500 in the subcooling operation. The control of the output of the electromagnetic wave from the electromagnetic wave irradiation device 300 which is performed by the controller 400 in the subcooling operation will be described later.

The cooling target object temperature sensor 500 measures a temperature of the cooling target object M. In particular, the cooling target object temperature sensor 500 measures a surface temperature of the cooling target object M in this embodiment.

For example, the cooling target object temperature sensor 500 is a noncontact type infrared sensor which measures a surface temperature of the cooling target object M by detecting an infrared ray generated by the cooling target object M. The cooling target object temperature sensor 500 is electrically connected to the controller 400. A signal based on the temperature of the cooling target object M detected by the cooling target object temperature sensor 500 (a signal for notifying the controller 400 of the measured temperature of the cooling target object M) is transmitted to the controller 400.

The casing temperature sensor 600 measures a temperature of the cooling space 110a of the casing 110. For example, the casing temperature sensor 600 is a thermistor. The casing temperature sensor 600 is electrically connected to the controller 400. A signal based on a temperature of the cooling space 110a detected by the casing temperature sensor 600 (a signal for notifying the controller 400 of a measured temperature of the cooling space 110a) is transmitted to the controller 400.

Note that a type of the cooling target object temperature sensor 500 and a type of the casing temperature sensor 600 of this embodiment are merely examples, and various sensors may be used as long as the sensors are capable of measuring a temperature of the cooling target object M and a temperature of the cooling space 110a.

(2) Detailed Configuration

The devices included in the cooling apparatus 100, specifically the refrigeration machine 200, the electromagnetic wave irradiation device 300, and the controller 400 will be described in detail.

(2-1) Refrigeration Machine

The refrigeration machine 200 mainly includes the casing outside unit 200a, the casing inside unit 200b, and a refrigeration machine controller 290 (refer to FIG. 1).

In the refrigeration machine 200, a compressor 210, a four-way switching valve 220, a second heat exchanger 250, an expansion valve 260, and an accumulator 280 of the casing outside unit 200a, and a first heat exchanger 230 of the casing inside unit 200b are connected to one another through a refrigerant pipe so as to configure a refrigerant circuit.

(2-1-1) Casing Inside Unit

The casing inside unit 200b mainly includes the first heat exchanger 230 and a casing inside fan 240 (refer to FIG. 1).

For example, the first heat exchanger 230 is a cross-fin type fin-and-tube heat exchanger including a heat transfer tube and a plurality of fins. The first heat exchanger 230 is connected to the liquid-refrigerant connection pipe 202 and the gas-refrigerant connection pipe 204 by the refrigerant pipes (refer to FIG. 1). The first heat exchanger 230 functions as an evaporator for refrigerant (a cooler) in the normal operation when the cooling target object M is cooled and functions as a condenser for refrigerant (a radiator) in a defrost operation. Note that the defrost operation is performed to remove frost formed on the second heat exchanger 250. A detailed description of the defrost operation is omitted.

The casing inside fan 240 is driven by a motor for a fan (not illustrated). The fan motor is preferably an inverter type motor. The casing inside fan 240 supplies air to the first heat exchanger 230 so as to facilitate heat exchange between the air and the refrigerant in the first heat exchanger 230. Furthermore, the casing inside fan 240 supplies the air which has flown through the first heat exchanger 230 and which has been cooled by the heat exchange with the refrigerant to the cooling space 110a so as to reduce a temperature in the cooling space 110a and cool the cooling target object M placed in the cooling space 110a.

(2-1-2) Casing Outside Unit

The casing outside unit 200a mainly includes the compressor 210, the four-way switching valve 220, the second heat exchanger 250, the expansion valve 260, a casing outside fan 270, and the accumulator 280 (refer to FIG. 1).

The casing outside unit 200a further includes a refrigerant pipe group 206 which connects the compressor 210, the four-way switching valve 220, the second heat exchanger 250, the expansion valve 260, and the accumulator 280 to one another (refer to FIG. 1). The refrigerant pipe group 206 includes a suction pipe 206a, a discharge pipe 206b, a first gas refrigerant pipe 206c, a liquid refrigerant pipe 206d, and a second gas refrigerant pipe 206e (refer to FIG. 1).

The connection between the components included in the casing outside unit 200a through the refrigerant pipe group 206 will be described. The suction pipe 206a is used to connect a suction port of the compressor 210 and the four-way switching valve 220 to each other. The accumulator 280 is disposed in the suction pipe 206a. The discharge pipe 206b is used to connect a discharge port of the compressor 210 and the four-way switching valve 220 to each other. The first gas refrigerant pipe 206c is used to connect the four-way switching valve 220 and the second heat exchanger 250 on a gas side to each other. The liquid refrigerant pipe 206d is used to connect the second heat exchanger 250 on a liquid side and the liquid-refrigerant connection pipe 202 to each other. The expansion valve 260 is disposed in the liquid refrigerant pipe 206d. The second gas refrigerant pipe 206e is used to connect the four-way switching valve 220 and the gas-refrigerant connection pipe 204 to each other.

The compressor 210 drives a compression mechanism by a motor (not illustrated) so as to suck gas refrigerant of a low pressure from the suction pipe 206a and discharge gas refrigerant of a high pressure which has been compressed by the compression mechanism to the discharge pipe 206b. The compressor 210 is preferably an inverter compressor.

The four-way switching valve 220 is a mechanism which changes a direction in which the refrigerant flows. In the cooling operation on the cooling target object M, as illustrated by a solid line in FIG. 1, the four-way switching valve 220 connects the suction pipe 206a and the second gas refrigerant pipe 206e, and in addition, connects the discharge pipe 206b and the first gas refrigerant pipe 206c. On the other hand, in the defrost operation, as illustrated by a dotted line in FIG. 1, the four-way switching valve 220 connects the suction pipe 206a and the first gas refrigerant pipe 206c, and in addition, connects the discharge pipe 206b and the second gas refrigerant pipe 206e.

For example, the second heat exchanger 250 is a cross-fin type fin-and-tube heat exchanger including a heat transfer tube and a plurality of fins. The second heat exchanger 250 functions as a condenser for refrigerant when the cooling target object M is cooled and functions as an evaporator for refrigerant in the defrost operation.

The expansion valve 260 is an example of an expansion mechanism which reduces pressure of the refrigerant supplied to the liquid refrigerant pipe 206d. The expansion valve 260 is an electric expansion valve having a variable opening degree.

The casing outside fan 270 is driven by a motor for a fan (not illustrated). The casing outside fan 270 supplies air to the second heat exchanger 250 so as to facilitate heat exchange between the air and the refrigerant in the second heat exchanger 250.

The accumulator 280 is a gas-liquid separator which separates the refrigerant supplied to the suction pipe 206a into a gas phase and a liquid phase so as to avoid liquid compression in the compressor 210 (to avoid supply of the refrigerant of the liquid phase to the compressor 210).

(2-1-3) Refrigeration Machine Controller

The refrigeration machine controller 290 is a computer which controls the operation of the refrigeration machine 200. The refrigeration machine controller 290 is a micro controller unit (MCU) including a central processing unit (CPU) and a memory, for example. Although the refrigeration machine controller 290 is drawn in the casing outside unit 200a in FIG. 1, as the refrigeration machine controller 290 may include an MCU included in the casing outside unit 200a and an MCU included in the casing inside unit 200b that works together to control the operation of the refrigeration machine 200.

Although not illustrated, the refrigeration machine controller 290 is electrically connected to the components included in the refrigeration machine 200, such as the compressor 210, the four-way switching valve 220, the fan motor of the casing inside fan 240, the expansion valve 260, and the fan motor of the casing outside fan 270. The refrigeration machine controller 290 controls the refrigeration machine 200 when the CPU executes programs stored in the memory.

Note that, in the refrigeration machine 200 controlled by the refrigeration machine controller 290, in the normal operation (the operation for cooling the cooling target object M), the refrigerant discharged from the compressor 210 is supplied through the four-way switching valve 220 to the second heat exchanger 250, heat of the refrigerant is discharged to the air outside the casing 110, and the refrigerant is condensed. The refrigerant condensed in the second heat exchanger 250 is expanded when passing the expansion valve 260. Thereafter, the refrigerant is supplied to the first heat exchanger 230 and absorbs heat from the air of the cooling space 110a so as to be evaporated.

The refrigeration machine controller 290 is also electrically connected to the controller 400 (refer to FIGS. 1 and 2). The refrigeration machine controller 290 controls operations of the components included in the refrigeration machine 200 in response to an instruction for operating or stopping the refrigeration machine 200 and an instruction for adjusting cooling capacity issued by the controller 400. For example, the cooling capacity of the refrigeration machine 200 is controlled by increasing or reducing an amount of wind of the casing outside fan 270 by changing a rotation speed of the fan motor included in the casing outside fan 270 (the cooling capacity becomes larger when an amount of wind is increased, and the cooling capacity becomes smaller when an amount of wind is reduced). Furthermore, the cooling capacity of the refrigeration machine 200 is controlled, for example, by controlling a temperature of the air after the heat exchange with the refrigerant at the first heat exchanger 230 to be increased or reduced by changing a speed of the compressor 210. The cooling capacity is increased when the temperature of the air obtained after the heat exchange with the refrigerant at the first heat exchanger 230 is reduced and the cooling capacity is reduced when the temperature of the air obtained after the heat exchange with the refrigerant in the first heat exchanger 230 is increased.

(2-2) Electromagnetic Wave Irradiation Device

The electromagnetic wave irradiation device 300 generates an electromagnetic field to act on the cooling target object M. In other words, the electromagnetic wave irradiation device 300 is a device which irradiates the cooling target object M with the electromagnetic wave.

The electromagnetic wave irradiation device 300 mainly includes the pair of electrodes 310 and a high frequency power source 320.

The pair of electrodes 310 is formed of metal, for example. Each of the pair of electrodes 310 has a plate like shape. However, the shape of the pair of electrodes 310 is not limited to the plate like shape and other shapes may be employed. The pair of electrodes 310 is disposed so as to face each other as a pair in the cooling space 110a of the casing 110. In other words, the electrodes 310 are disposed in parallel to each other as a pair.

The electrodes 310 are connected to the high frequency power source 320 (refer to FIG. 1). Note that the electrodes 310 may be connected to the high frequency power source 320 through a load matching circuit (not illustrated).

A frequency and an output of the high frequency power source 320 are variable. The high frequency power source 320 uses a self-oscillation circuit, for example. Note that the high frequency power source 320 is not limited to this and may use a forced-oscillation circuit.

The high frequency power source 320 is electrically connected to the controller 400 and controlled by the controller 400. The electromagnetic wave irradiation device 300 switches between performing irradiation and stopping of irradiation with the electromagnetic wave in response to an instruction issued by the controller 400 to the high frequency power source 320. Furthermore, the electromagnetic wave irradiation device 300 changes the frequency of the electromagnetic wave to be irradiated, within the settable frequency range (in the range between the minimum frequency fmin and the maximum frequency fmax) described above in response to an instruction issued by the controller 400 to the high frequency power source 320. Moreover, the electromagnetic wave irradiation device 300 changes the output of the electromagnetic wave to be irradiated, within the settable output range (in the range between the minimum output Smin and the maximum output Smax) described above in response to an instruction issued by the controller 400 to the high frequency power source 320. In other words, the electromagnetic wave irradiation device 300 changes the frequency of the electromagnetic field or the intensity of the electromagnetic field in response to an instruction issued by the controller 400 to the high frequency power source 320.

(2-3) Controller

The controller 400 is a computer which controls the operations of the refrigeration machine 200 and the electromagnetic wave irradiation device 300. The controller 400 includes a CPU and a memory similarly to general computers. The controller 400 controls the operations of the refrigeration machine 200 and the electromagnetic wave irradiation device 300 when the CPU executes programs for operation control of the cooling apparatus 100 stored in the memory.

The controller 400 is electrically connected to the refrigeration machine controller 290 so as to control the operation of the refrigeration machine 200 (refer to FIG. 2). Furthermore, the controller 400 is electrically connected to the high frequency power source 320 to control the operation of the electromagnetic wave irradiation device 300 (refer to FIG. 2). Moreover, the controller 400 is electrically connected to the cooling target object temperature sensor 500 and the casing temperature sensor 600 (refer to FIG. 2) and receives a signal indicating a temperature of the cooling target object M transmitted from the cooling target object temperature sensor 500 and a signal indicating a temperature of the cooling space 110a transmitted from the casing temperature sensor 600.

Although it is assumed that a computer executes a program as the controller 400 so as to control the cooling apparatus 100 in this embodiment, the controller 400 may realize the similar control by hardware.

(3) Operation of Cooling Apparatus

Operation of the cooling apparatus 100 will be described hereinafter.

The cooling apparatus 100 performs at least three types of operation (including the preliminary operation, the normal cooling operation, and the subcooling operation) as described above when the controller 400 controls the operations of the refrigeration machine 200 and the electromagnetic wave irradiation device 300.

Figure 3:
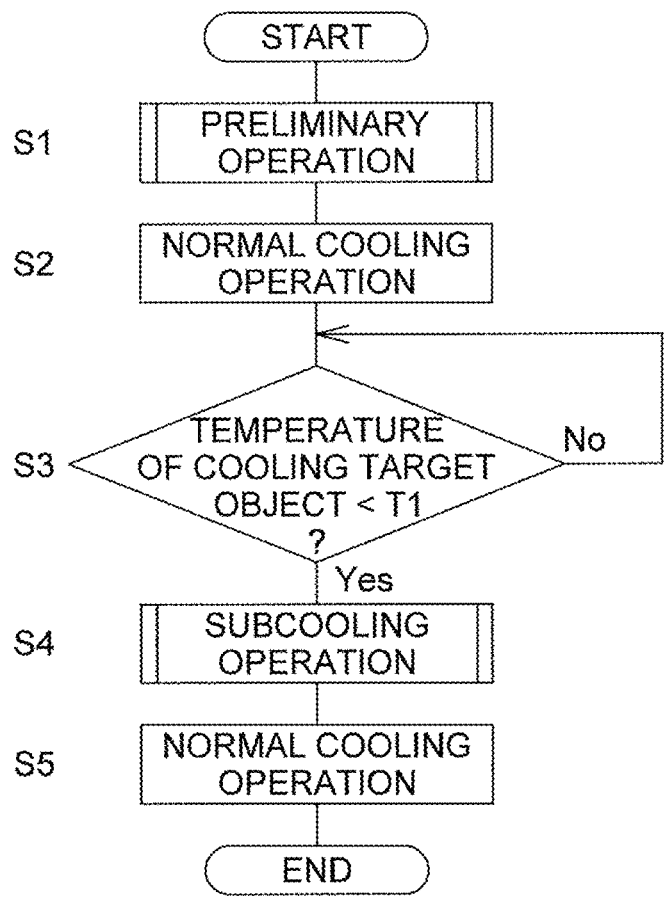
FIG. 3 is an example of a flowchart of a cooling process of a cooling target object performed by the cooling apparatus of FIG. 1.

Specifically, when an operation start switch (not illustrated) of the cooling apparatus 100 is pressed, for example, the controller 400 causes the cooling apparatus 100 to execute the various operations in accordance with a flowchart of FIG. 3.

First, the controller 400 performs a preliminary operation so as to determine the frequency (the subcooling operation frequency f1) of the electromagnetic wave irradiated from the electromagnetic wave irradiation device 300 to the cooling target object M in the subcooling operation to be performed later (step S1). In other words, the controller 400 controls the operation of the electromagnetic wave irradiation device 300 to perform the preliminary operation to determine the frequency of the electromagnetic field to be generated in the subcooling operation. Note that a temperature of the cooling target object M at a start of operation of the cooling apparatus 100 is higher than an upper limit value (−1° C.) of the maximum ice crystal production zone. In other words, the preliminary operation is performed when a temperature of the cooling target object M detected by the cooling target object temperature sensor 500 is higher than the upper limit value of the maximum ice crystal production zone. Furthermore, the preliminary operation is preferably performed when a temperature of the cooling target object M detected by the cooling target object temperature sensor 500 is higher than the freezing point of the cooling target object M (that is, when being in a state in which freezing of the cooling target object M has not been started).

In the preliminary operation, the operations of the refrigeration machine 200 and the electromagnetic wave irradiation device 300 are mainly controlled by a subcooling operation frequency determination unit 410 which is one of functional units of the controller 400. The subcooling operation frequency determination unit 410 determines the subcooling operation frequency f1 by a method described below. The preliminary operation (including the operations of the refrigeration machine 200 and the electromagnetic wave irradiation device 300 in the preliminary operation and the method for determining the subcooling operation frequency f1 employed in the subcooling operation frequency determination unit 410) will be described later in detail.

After the preliminary operation is performed, the controller 400 starts the normal cooling operation (step S2). Specifically, in step S2, the controller 400 starts the operation of the refrigeration machine 200 while the operation of the electromagnetic wave irradiation device 300 is stopped.

In step S3, the controller 400 determines whether a temperature detected by the cooling target object temperature sensor 500 is lower than a first temperature T1. The determination in step S3 is repeatedly performed until it is determined that the temperature detected by the cooling target object temperature sensor 500 is lower than the first temperature T1.

The first temperature T1 is a predetermined value higher than the upper limit value (−1° C.) of the maximum ice crystal production zone. Furthermore, the first temperature T1 is preferably higher than the freezing point of the cooling target object M. The freezing point of the cooling target object M may be included in a range of the maximum ice crystal production zone in many cases, but may be higher than the upper limit value of the maximum ice crystal production zone. An appropriate value which is not higher than freezing points of various objects M to be cooled is preferably selected as the first temperature T1. The first temperature T1 is for example 0° C., but is not limited to.

Note that the determination in step S3 is performed to avoid that the temperature of the cooling target object M falls to a temperature lower than the upper limit value of the maximum ice crystal production zone in the normal cooling operation and freezing of the cooling target object M without being subcooled. Therefore, the determination process in step S3 is preferably executed with a comparatively short time interval (a time interval being set such that a temperature of the cooling target object M which was higher than the first temperature T1 in a preceding determination will not become lower than the upper limit value of the maximum ice crystal production zone in a next determination).

When it is determined that a temperature detected by the cooling target object temperature sensor 500 is lower than the first temperature T1 in step S3, the controller 400 starts the subcooling operation (step S4). In other words, the controller 400 starts the operation of the electromagnetic wave irradiation device 300.

In the subcooling operation, the operations of the refrigeration machine 200 and the electromagnetic wave irradiation device 300 are mainly controlled by an electromagnetic wave output/freezing capacity controller 420 which is one of the functional units of the controller 400. The electromagnetic wave output/freezing capacity controller 420 controls the output of the electromagnetic wave to be irradiated from the electromagnetic wave irradiation device 300 and the cooling capacity of the refrigeration machine 200 in a method described below. The subcooling operation will be described hereinafter in detail.

In step S4, when a predetermined condition is satisfied, the controller 400 stops the operation of the electromagnetic wave irradiation device 300 being operated. In other words, when a predetermined condition is satisfied in step S4, the controller 400 starts the normal cooling operation (step S5). It will be described later in what case the process proceeds from step S4 to step S5. The entire cooling target object M enters a frozen state by performing the normal cooling operation is executed for a predetermined period of time in step S5. The controller 400 then controls the refrigeration machine 200 such that a predetermined temperature of the frozen cooling target object M is maintained.

The preliminary operation and the subcooling operation will be described further in detail hereinafter.

(3-1) Preliminary Operation

Figure 4:
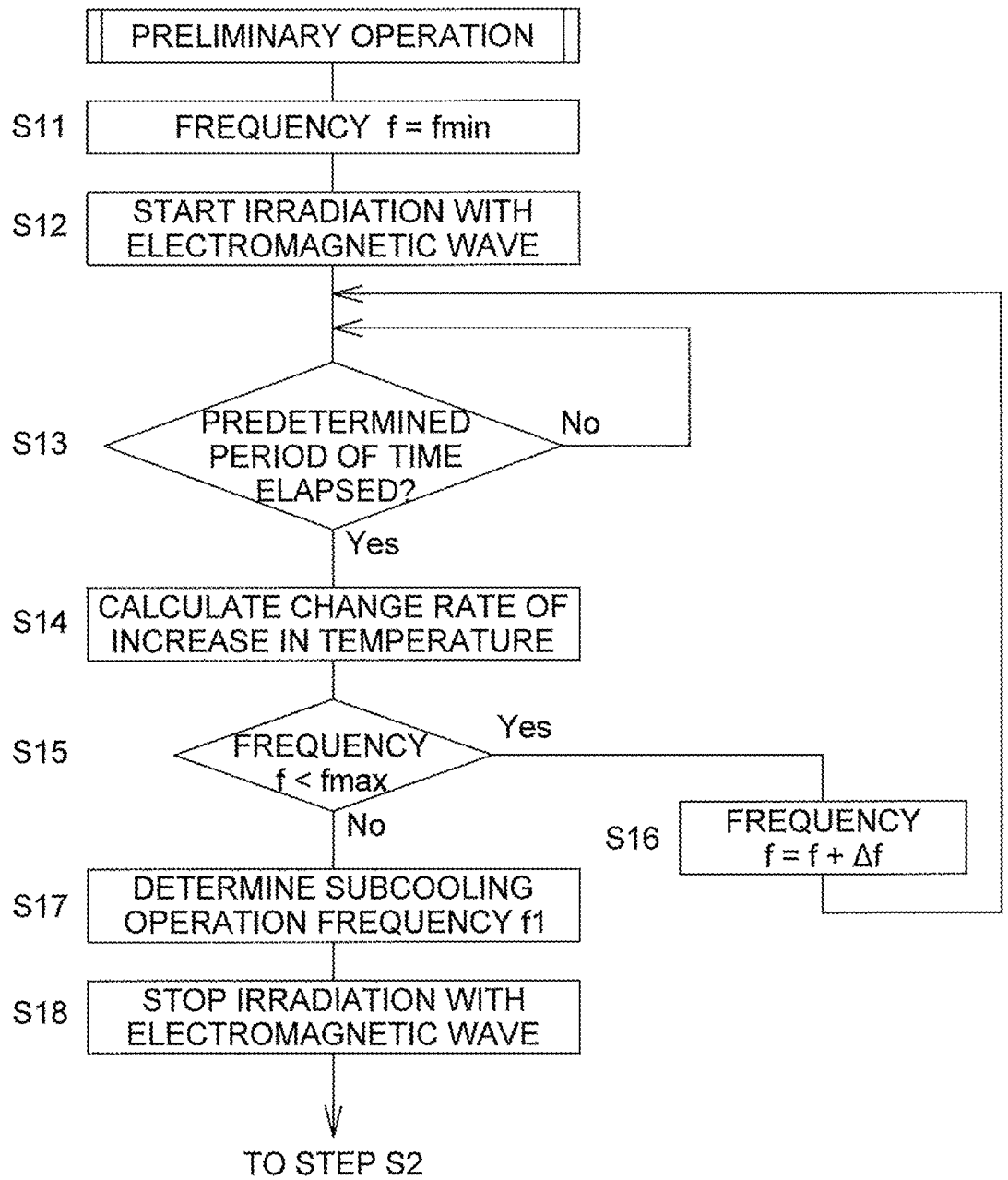
FIG. 4 is an example of a flowchart of an operation performed by the cooling apparatus in a preliminary operation in the cooling process of FIG. 3.

The operation of the cooling apparatus 100 in the preliminary operation is mainly controlled by the subcooling operation frequency determination unit 410 of the controller 400 as illustrated in a flowchart of FIG. 4, for example. Note that, although not described hereinafter, the subcooling operation frequency determination unit 410 appropriately obtains a temperature of the cooling target object M detected by the cooling target object temperature sensor 500 in the preliminary operation.

When the preliminary operation is started, the subcooling operation frequency determination unit 410 sets the frequency f of the electromagnetic wave to be irradiated from the electromagnetic wave irradiation device 300 to the minimum frequency fmin (step S11) of the predetermined settable frequency range. Then the subcooling operation frequency determination unit 410 performs controls the electromagnetic wave irradiation device 300 such that the electromagnetic wave irradiation device 300 starts irradiation with the electromagnetic wave (step S12). Note that the subcooling operation frequency determination unit 410 preferably sets an output S of an electromagnetic wave irradiated from the electromagnetic wave irradiation device 300 to a constant value (the minimum output Smin, for example) in the preliminary operation.

In step S13, it is determined whether a predetermined period of time (5 seconds, for example) has elapsed after the electromagnetic wave irradiation device 300 started the irradiation with an electromagnetic wave of a current frequency f. The process in step S13 is repeatedly performed until it is determined that the predetermined period of time has elapsed after the electromagnetic wave irradiation device 300 started the irradiation with an electromagnetic wave of a current frequency f.

In step S14, the subcooling operation frequency determination unit 410 calculates a change rate of the temperature of the cooling target object M obtained when the electromagnetic wave of the frequency f is irradiated in accordance with a temperature of the cooling target object M obtained when the electromagnetic wave irradiation device 300 starts irradiation with the electromagnetic wave of the current frequency f, a temperature of the cooling target object M obtained when a predetermined period of time has elapsed after the electromagnetic wave irradiation device 300 started the irradiation with the electromagnetic wave of the current frequency f (a current temperature of the cooling target object M), and the predetermined period of time. Then, the subcooling operation frequency determination unit 410 stores a value of the frequency f and the calculated change rate of the temperature of the cooling target object M obtained when the electromagnetic wave of the frequency f is irradiated by relating them with each other in a memory that is not illustrated.

In step S15, it is determined whether the frequency f of the electromagnetic wave irradiated from the electromagnetic wave irradiation device 300 is smaller than the maximum frequency fmax of the settable frequency range. When the frequency f of the electromagnetic wave irradiated from the electromagnetic wave irradiation device 300 is smaller than the maximum frequency fmax in the settable frequency range, the process proceeds to step S16, and when the frequency f of the electromagnetic wave irradiated from the electromagnetic wave irradiation device 300 is the maximum frequency fmax, the process proceeds to step S17.

When the process proceeds to step S16, the subcooling operation frequency determination unit 410 increases the frequency f of the electromagnetic wave irradiated from the electromagnetic wave irradiation device 300 from the currently used frequency by Δf. For example, Δf is a value obtained by dividing a value, obtained by subtracting the minimum frequency fmin from the maximum frequency fmax, by a certain integer. Although the frequency f of the electromagnetic wave irradiated from the electromagnetic wave irradiation device 300 is increased by a certain amount (Δf) every time the process in step S16 is performed in this embodiment, the present invention is not limited to this. For example, in a case where the number of possible frequencies, including F1, F2, F3, . . . FN (F1(=fmin)<F2<F3 . . . <FN(=fmax)), of the electromagnetic wave irradiated from the electromagnetic wave irradiation device 300 is N, the frequency f of the electromagnetic wave may be changed in a step-by-step manner from F1 to F2, from F2 to F3, and so on every time the process in step S16 is executed.

When the frequency f of the electromagnetic wave irradiated from the electromagnetic wave irradiation device 300 is changed in step S16, the process returns to step S13 and it is determined whether a predetermined period of time has elapsed after the irradiation with the electromagnetic wave of the frequency f started. When it is determined that the predetermined period of time has elapsed in step S13, the subcooling operation frequency determination unit 410 calculates the change rate of the temperature of the cooling target object M obtained when the electromagnetic wave of that frequency f is irradiated (step S14). Furthermore, in step S14, the subcooling operation frequency determination unit 410 stores the value of the frequency f and the change rate of the temperature of the cooling target object M, which is obtained when the electromagnetic wave of the frequency f is irradiated, by relating them with each other in the memory that is not illustrated. These processes are repeatedly performed until it is determined that the frequency f irradiated from the electromagnetic wave irradiation device 300 is fmax in step S15.

In step S17, the subcooling operation frequency determination unit 410 specifies a maximum value in the change rates (which are stored in the memory that is not illustrated) of the temperature of the cooling target object M which are calculated in the process of steps S14, which is performed a plurality of times, and determines a value of the frequency associated with the maximum change rate as the subcooling operation frequency f1. In other words, the subcooling operation frequency determination unit 410 determines the subcooling operation frequency f1 in accordance with temperatures measured by the cooling target object temperature sensor 500 when the electromagnetic wave of each of various frequencies is irradiated in the preliminary operation. More specifically, the subcooling operation frequency determination unit 410 determines the subcooling operation frequency f1 in accordance with the change rate of the temperature measured by the cooling target object temperature sensor 500 when electromagnetic wave of each of various frequencies is irradiated in the preliminary operation.

Thereafter, in step S18, the subcooling operation frequency determination unit 410 stops the operation of the electromagnetic wave irradiation device 300 so as to stop the irradiation with the electromagnetic wave to the cooling target object M. After step S18, the process proceeds to step S2.

Note that the operation of the cooling apparatus 100 in the preliminary operation described hereinabove is merely an example and the present invention is not limited to this.

For example, a period of time in which electromagnetic wave of each of various frequencies is irradiated to the cooling target object M may not be constant. For example, it may be determined whether a period of time which has elapsed after the irradiation with the electromagnetic wave of each of the various frequencies to the cooling target object M started exceeds the predetermined period of time in step S13, and change rates of temperatures of the cooling target object M which are measured by the cooling target object temperature sensor 500 when the irradiation with the electromagnetic wave of each of the various frequencies is performed may be calculated using the different elapsed times in step S14.

Furthermore, when periods of time in which the irradiation with the electromagnetic waves of the various frequencies to the cooling target object M are constant, for example, change amounts of temperatures measured by the cooling target object temperature sensor 500 may be calculated in step S14. Then, in step S17, the subcooling operation frequency determination unit 410 may specify a maximum value in change amounts of the temperatures of the cooling target object M which are calculated in the process in steps S14 which are performed a plurality of times, and determine a value of the frequency associated with the maximum value as the subcooling operation frequency f1.

Although the frequency f of the electromagnetic wave irradiated from the electromagnetic wave irradiation device 300 is changed to be larger in a step-by-step manner in the preliminary operation in the flowchart of FIG. 4, the present invention is not limited to this. For example, the frequency f of the electromagnetic wave irradiated from the electromagnetic wave irradiation device 300 may be changed to be smaller from the maximum frequency fmax in a step-by-step manner in the preliminary operation.

Furthermore, order of the steps in the flowchart of FIG. 4 may be changed as far as consistency of a purpose of calculation of the subcooling operation frequency f1 is maintained, for example. Step S17 and step S18 may be switched, for example.

Furthermore, although the irradiation with an electromagnetic wave is continuously performed in a period of time from when the irradiation with the electromagnetic wave is started in step S12 to when the irradiation with an electromagnetic wave is stopped in step S18 in the flowchart of FIG. 4, the present invention is not limited to this. For example, the irradiation with an electromagnetic wave performed by the electromagnetic wave irradiation device 300 may be stopped and restarted every time the frequency of the electromagnetic wave to be irradiated is changed.

Furthermore, for example, although the frequency of the electromagnetic wave is changed in a range between the minimum frequency fmin and the maximum frequency fmax within the settable frequency range in the flowchart of FIG. 4, the present invention is not limited to this. For example, the subcooling operation frequency determination unit 410 may change the frequency of the electromagnetic wave to be irradiated, in a partial range within the settable frequency range.

(3-2) Subcooling Operation

Figure 5:
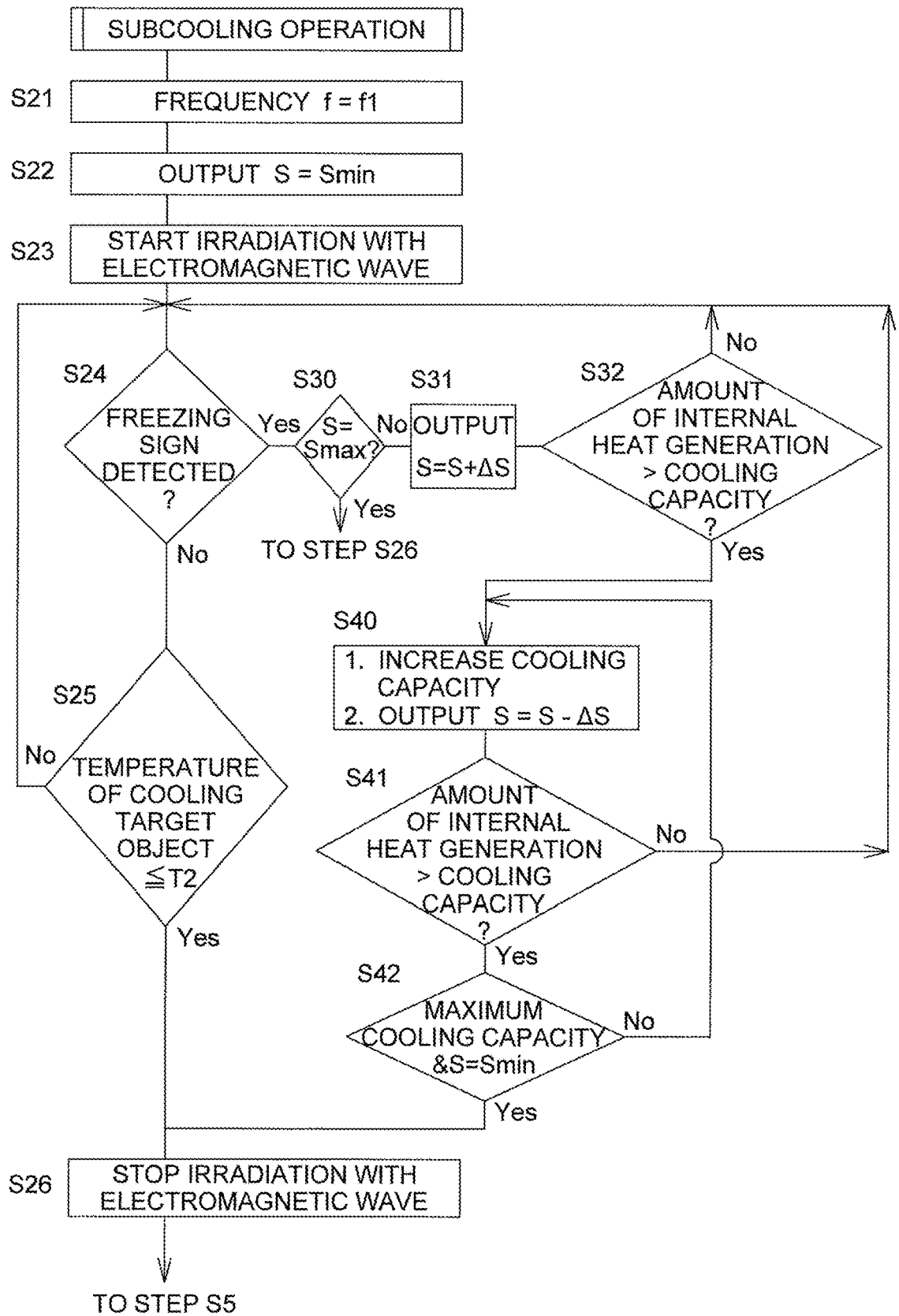
FIG. 5 is an example of a flowchart of an operation of the cooling apparatus in a subcooling operation in the cooling process of FIG. 3.

The subcooling operation of the cooling apparatus 100 is mainly controlled by the electromagnetic wave output/freezing capacity controller 420 of the controller 400 in accordance with a flowchart of FIG. 5, for example.

Note that it is assumed that the refrigeration machine 200 operates with predetermined cooling capacity when the subcooling operation is started. The predetermined cooling capacity is intermediate cooling capacity between minimum cooling capacity and maximum cooling capacity of the refrigeration machine 200, for example. Note that the present invention is not limited to this and the predetermined cooling capacity may be the minimum cooling capacity of the refrigeration machine 200 or the maximum cooling capacity of the refrigeration machine 200, for example. Furthermore, although not described hereinafter, the electromagnetic wave output/freezing capacity controller 420 appropriately obtains a temperature of the cooling target object M detected by the cooling target object temperature sensor 500 and a temperature of the cooling space 110a detected by the casing temperature sensor 600 in the subcooling operation.

Here, the electromagnetic wave output/freezing capacity controller 420 sets the subcooling operation frequency f1 as a frequency of an electromagnetic wave irradiated from the electromagnetic wave irradiation device 300 (step S21). The frequency of the electromagnetic wave irradiated from the electromagnetic wave irradiation device 300 is not changed in the subcooling operation.

Subsequently, the electromagnetic wave output/freezing capacity controller 420 sets a lower limit value (the minimum output Smin) of the settable output range (step S22) as an output S of the electromagnetic wave irradiated from the electromagnetic wave irradiation device 300 (step S22). In other words, the electromagnetic wave output/freezing capacity controller 420 sets the lower limit value (the minimum intensity) of the settable range as the intensity of the electromagnetic field generated by the electromagnetic wave irradiation device 300.

Then, the electromagnetic wave output/freezing capacity controller 420 causes the electromagnetic wave irradiation device 300 to start irradiation with the electromagnetic wave of the subcooling operation frequency f1 set in step S21 and the output S set in step S22 (step S23). Specifically, the electromagnetic wave output/freezing capacity controller 420 starts the subcooling operation (an operation of cooling the cooling target object M by the refrigeration machine 200 in a state in which an electromagnetic wave is irradiated to the cooling target object M) in a state in which the minimum output Smin is set as the output S of the electromagnetic wave irradiated from the electromagnetic wave irradiation device 300.

Thereafter, the electromagnetic wave output/freezing capacity controller 420 detects a sign indicating that the cooling target object M is to enter a frozen state in accordance with a change rate of the temperature detected by the cooling target object temperature sensor 500 in the subcooling operation (step S24).

The detection of the sign indicating that the cooling target object M is to enter the frozen state is performed as follows.

When the cooling target object M is frozen, a temperature of the cooling target object M exhibits one of the following changes.

1) A temperature of the cooling target object M is substantially constant since heat is used for a phase change (refer to a state I in FIG. 6(a)).

2) A temperature of the cooling target object is increased when a state of the cooling target object M is changed from the subcooling state to the frozen state (refer to a state II in FIG. 6(b)).

Here, the electromagnetic wave output/freezing capacity controller 420 detects a sign indicating that the cooling target object M is to enter the frozen state in accordance with the change rate of the temperature of the cooling target object M detected by the cooling target object temperature sensor 500. Specifically, the electromagnetic wave output/freezing capacity controller 420 detects that there is the sign indicating that the cooling target object M is to enter the frozen state in a case where the change rate of the temperature of the cooling target object M detected by the cooling target object temperature sensor 500 is zero (including a case where an amount of reduction of the temperature of the cooling target object M is smaller than a predetermined value) or a positive value (in a case where the temperature is gradually increased).

When the sign indicating that the cooling target object M is to enter the frozen state is not detected in step S24, the process proceeds to step S25. When the sign indicating that the cooling target object M is to enter the frozen state is detected in step S24, the process proceeds to step S30.

In step S25, the electromagnetic wave output/freezing capacity controller 420 determines whether the temperature of the cooling target object M detected by the cooling target object temperature sensor 500 is equal to or lower than a predetermined second temperature T2. The second temperature T2 is lower than the lower limit value (−5° C.) of the maximum ice crystal production zone. When it is determined that the temperature of the cooling target object M detected by the cooling target object temperature sensor 500 is equal to or lower than the second temperature T2 in step S25, the process proceeds to step S26. When it is determined that the temperature of the cooling target object M detected by the cooling target object temperature sensor 500 is higher than the second temperature T2 in step S25, the process returns to step S24.

In step S26, the irradiation with the electromagnetic wave to the cooling target object M performed by the electromagnetic wave irradiation device 300 is stopped (generation of an electromagnetic field performed by the electromagnetic wave irradiation device 300 is stopped) while the cooling performed by the refrigeration machine 200 is maintained (the operation of the refrigeration machine 200 is continued), and the process proceeds to step S5 in FIG. 3. In other words, the electromagnetic wave output/freezing capacity controller 420 stops the irradiation with the electromagnetic wave to the cooling target object M (the generation of an electromagnetic field) performed by the electromagnetic wave irradiation device 300 while the cooling performed by the refrigeration machine 200 is maintained after the cooling target object M is cooled such that the temperature of the cooling target object M detected by the cooling target object temperature sensor 500 is lowered to the second temperature T2. Note that the controller 400 preferably controls the refrigeration machine 200 so that the cooling capacity is increased (to the maximum cooling capacity, for example) when the process proceeds from step S26 to step S5.

The case where the process proceeds from step S24 to step S30 (that is, the case where, in the subcooling operation, the electromagnetic wave output/freezing capacity controller 420 detects the sign indicating that the cooling target object M is to enter the frozen state in accordance with the change rate of the temperature of the cooling target object M detected by the cooling target object temperature sensor 500) will now be described.

In step S30, the electromagnetic wave output/freezing capacity controller 420 determines whether the output S of the electromagnetic wave irradiated from the electromagnetic wave irradiation device 300 to the cooling target object M is the upper limit value (the maximum output Smax) of the settable output range.

The electromagnetic wave output/freezing capacity controller 420 intends to maintain the subcooling state of the cooling target object M by increasing the output of the electromagnetic wave irradiated from the electromagnetic wave irradiation device 300 (the intensity of the electromagnetic field) as shown in step S31 described below when detecting the sign indicating that the cooling target object M is to enter the frozen state. In contrast, when the maximum output Smax has been set as the output S of the electromagnetic wave, the process proceed to step S26 such that the electromagnetic wave output/freezing capacity controller 420 changes the subcooling operation to the normal cooling operation since it is difficult to maintain the subcooling state of the cooling target object M (it is difficult to increase the output S of the electromagnetic wave). When the electromagnetic wave output/freezing capacity controller 420 determines that the output S of the electromagnetic wave is not the maximum output Smax in step S30, the process proceeds to step S31.

In step S31, the electromagnetic wave output/freezing capacity controller 420 increases the output of the electromagnetic wave irradiated from the electromagnetic wave irradiation device 300 to the cooling target object M by ΔS (a predetermined value) (i.e. increases the intensity of the electromagnetic field by a predetermined amount). For example, ΔS is a value obtained by dividing a value, which is obtained by subtracting the minimum output Smin from the maximum output Smax, by a certain integer. In other words, the electromagnetic wave output/freezing capacity controller 420 controls the output S of the electromagnetic wave irradiated from the electromagnetic wave irradiation device 300 to the cooling target object M in accordance with the temperature of the cooling target object M detected by the cooling target object temperature sensor 500, or more specifically, in accordance with the change rate of the temperature of the cooling target object M detected by the cooling target object temperature sensor 500 (in a case where the change rate is zero or a positive value).

After the output S of the electromagnetic wave irradiated from the electromagnetic wave irradiation device 300 to the cooling target object M is increased by ΔS in step S31, the process proceeds to step S32. In step S32, the electromagnetic wave output/freezing capacity controller 420 determines whether an amount of heat of internal heat generation in the cooling target object M generated by the electromagnetic wave is larger than the cooling capacity of the refrigeration machine 200.

Specifically, the electromagnetic wave output/freezing capacity controller 420 determines whether a temperature of the cooling space 110a detected by the casing temperature sensor 600 tends to be increased. When the electromagnetic wave output/freezing capacity controller 420 determines that the temperature of the cooling space 110a detected by the casing temperature sensor 600 tends to be increased in step S32 (determines that the amount of heat of the internal heat generation of the cooling target object M generated by the electromagnetic wave is larger than the cooling capacity of the refrigeration machine 200), the process proceeds to step S40.

Furthermore, in step S32, the electromagnetic wave output/freezing capacity controller 420 determines whether the temperature of the cooling target object M continuously detected by the cooling target object temperature sensor 500 is continuously increased for a predetermined period of time or more.

The temperature of the cooling target object M rises when a state of the cooling target object M is changed from the subcooling state to the frozen state as described above. The sign indicating that the cooling target object M is to enter the frozen state is detected using this characteristic in step S24. However, if the temperature of the cooling target object M rises when the subcooling state of the cooling target object M is changed to the frozen state, the increase of the temperature terminates within a comparatively short period of time and the temperature of the cooling target object M becomes substantially constant. On the other hand, if the temperature of the cooling target object M continuously rises even after a predetermined period of time has elapsed, it may be conceivable that the amount of heat of the internal heat generation of the cooling target object M generated by the electromagnetic wave is larger than the cooling capacity of the refrigeration machine 200. Therefore, when the electromagnetic wave output/freezing capacity controller 420 determines that the temperature of the cooling target object M detected by the cooling target object temperature sensor 500 continuously rises for the predetermined period of time or more in step S32, the process also proceeds to step S40.

Note that, when the electromagnetic wave output/freezing capacity controller 420 determines in step S32 that the amount of heat of the internal heat generation of the cooling target object M generated by the electromagnetic wave is not larger than the cooling capacity of the refrigeration machine 200, the process returns to step S24.

In step S40, the electromagnetic wave output/freezing capacity controller 420 controls the operations of the refrigeration machine 200 or the electromagnetic wave irradiation device 300 such that the cooling capacity of the refrigeration machine 200 becomes larger than the amount of heat of the internal heat generation of the cooling target object M generated by the electromagnetic wave.

Specifically, if the refrigeration machine 200 has a margin for increase of the cooling capacity in step S40, the electromagnetic wave output/freezing capacity controller 420 increases the freezing capacity of the refrigeration machine 200. An amount of the increase in the freezing capacity in step S40 may be appropriately determined. Furthermore, when the cooling capacity of the refrigeration machine 200 has been already at its maximum in step S40, the output of the electromagnetic wave irradiated from the electromagnetic wave irradiation device 300 is reduced by ΔS (the intensity of the electromagnetic field generated by the electromagnetic wave irradiation device 300 is reduced).

Note that the electromagnetic wave output/freezing capacity controller 420 preferentially performs control of the freezing capacity of the refrigeration machine 200 in this embodiment, and controls the output of the electromagnetic wave irradiated from the electromagnetic wave irradiation device 300 if it is not possible to control the freezing capacity of the refrigeration machine 200. However, the present invention is not limited to this. For example, the freezing capacity of the refrigeration machine 200 and the output of the electromagnetic wave irradiated from the electromagnetic wave irradiation device 300 may be simultaneously controlled. Furthermore, in this embodiment, the electromagnetic wave output/freezing capacity controller 420 controls both of the freezing capacity of the refrigeration machine 200 and the output of the electromagnetic wave irradiated from the electromagnetic wave irradiation device 300 and this is preferable. However, the present invention is not limited to this and the electromagnetic wave output/freezing capacity controller 420 may control either one of the freezing capacity and the output of the electromagnetic wave.

After step S40, the process proceeds to step S41.

In step S41, the electromagnetic wave output/freezing capacity controller 420 determines whether an amount of heat of internal heat generation in the cooling target object M generated by the electromagnetic wave is larger than the cooling capacity of the refrigeration machine 200. The determination process performed in step S41 is the same as the determination process performed in step S32. When it is determined that the amount of heat of the internal heat generation of the cooling target object M generated by the electromagnetic wave is larger than the cooling capacity of the refrigeration machine 200 in step S41, the process proceeds to step S42. On the other hand, when it is determined that the amount of heat of the internal heat generation of the cooling target object M generated by the electromagnetic wave is not larger than the cooling capacity of the refrigeration machine 200 in step S41, the process returns to step S24.

In step S42, the electromagnetic wave output/freezing capacity controller 420 determines whether the cooling capacity of the refrigeration machine 200 is at its maximum and the output S of the electromagnetic wave irradiated from the electromagnetic wave irradiation device 300 is the minimum output Smin. When the cooling capacity of the refrigeration machine 200 is determined to be at its maximum and the output S of the electromagnetic wave irradiated from the electromagnetic wave irradiation device 300 is determined to be the minimum output Smin in step S42, the temperature of the cooling target object M is gradually increased if the electromagnetic wave irradiation device 300 continuously irradiates the cooling target object M with the electromagnetic wave. Therefore, the process proceeds to step S26 and the subcooling operation is stopped and the operation of the cooling apparatus 100 is changed to the normal cooling operation. When it is determined that the cooling capacity of the refrigeration machine 200 is not at its maximum or the output S of the electromagnetic wave irradiated from the electromagnetic wave irradiation device 300 is not the minimum output Smin in step S42, the process returns to step S40.

Note that the operation of the cooling apparatus 100 in the subcooling operation described hereinabove is merely an example and the present invention is not limited to this.

For example, order of the steps in the flowchart of FIG. 5 may be appropriately changed. For example, the order of step S21 and step S22 may be switched, for example.

For example, in step S32 and step S41, it may be determined that the amount of heat of the internal heat generation of the cooling target object M generated by the irradiation with the electromagnetic wave is larger than the cooling capacity of the refrigeration machine 200 only when it is determined that the temperature of the cooling space 110a tends to be increased.

(4) Characteristics (4-1)

The cooling apparatus 100 of this embodiment includes the refrigeration machine 200, the electromagnetic wave irradiation device 300 which is an example of a generator, the controller 400, and the cooling target object temperature sensor 500 which is an example of a temperature sensor. The refrigeration machine 200 cools the cooling target object M. The electromagnetic wave irradiation device 300 generates the electromagnetic field to act on the cooling target object M. Intensity of an electromagnetic field generated by the electromagnetic wave irradiation device 300 is variable. The controller 400 controls the operations of the refrigeration machine 200 and the electromagnetic wave irradiation device 300 and performs the cooling operation for cooling the cooling target object M by the refrigeration machine 200 in a state in which an electromagnetic field is generated. The cooling target object temperature sensor 500 measures a temperature of the cooling target object M. In the cooling operation, the controller 400 controls intensity of the electromagnetic field generated by the electromagnetic wave irradiation device 300 in accordance with a temperature measured by the cooling target object temperature sensor 500.

In other words, the cooling apparatus 100 of this embodiment includes the refrigeration machine 200, the electromagnetic wave irradiation device 300, the controller 400, and the cooling target object temperature sensor 500. The refrigeration machine 200 cools the cooling target object M. The electromagnetic wave irradiation device 300 irradiates the cooling target object M with an electromagnetic wave so as to cause internal heat generation in the cooling target object M. An output of an electromagnetic wave to be irradiated from the electromagnetic wave irradiation device 300 is variable. The controller 400 controls the operations of the refrigeration machine 200 and the electromagnetic wave irradiation device 300 and performs the cooling operation for cooling the cooling target object M by the refrigeration machine 200 while an electromagnetic wave is irradiated to the cooling target object M. The cooling target object temperature sensor 500 measures a temperature of the cooling target object M. In the cooling operation, the controller 400 controls output of an electromagnetic wave to be irradiated from the electromagnetic wave irradiation device 300 to the cooling target object M in accordance with a temperature measured by the cooling target object temperature sensor 500.

In the cooling apparatus 100, the intensity of the electromagnetic field to be generated is not determined in advance but the intensity of the electromagnetic field is controlled in accordance with the temperature of the cooling target object M which is being cooled. Therefore, the cooling apparatus 100 may produce a subcooling state with high efficiently and less power consumption for any type of cooling target object M.

(4-2)

In the cooling apparatus 100 of this embodiment, the controller 400 controls the intensity of the electromagnetic field (an output of the electromagnetic wave to be irradiated from the electromagnetic wave irradiation device 300 to the cooling target object M) in accordance with a change rate of the temperature in the cooling operation.

In the cooling apparatus 100, the intensity of the electromagnetic field is appropriately controlled in accordance with the change rate of the temperature of the cooling target object M that is being cooled, which can be easily used as an index for determining whether the subcooling state is realized. Therefore, the cooling apparatus 100 can efficiently produce the subcooling state of the cooling target object M with less power consumption.

(4-3)

In the cooling apparatus 100 of this embodiment, in the cooling operation, the controller 400 detects a sign indicating that the cooling target object M is to enter the frozen state in accordance with the change rate of the temperature and increases the intensity of the electromagnetic field when the sign is detected.

In the cooling apparatus 100, when the sign indicating that the cooling target object M is to be frozen is detected, the intensity of the electromagnetic field is increased so that the cooling target object M is not frozen. Therefore, the cooling apparatus 100 may prevent the cooling target object M from being frozen in the maximum ice crystal production zone that is out of the subcooling state and.

Note that, when the cooling target object M is frozen, the temperature of the cooling target object M normally exhibits one of the following changes.

1) A temperature of the cooling target object M is substantially constant since heat is used for a phase change.

2) The temperature of the cooling target object M rises when cooling target object M is changed from the subcooling state to the frozen state.

Therefore, the controller 400 preferably detects the sign indicating that the cooling target object M is to be frozen by detecting the temperature change of the cooling target object M.

(4-4)

In the cooling apparatus 100 of this embodiment, in the cooling operation, the controller 400 stops generation of the electromagnetic field by the electromagnetic wave irradiation device 300 while continuing cooling by the refrigeration machine 200 after the cooling target object M is cooled such that a temperature detected by the cooling target object temperature sensor 500 is lowered to a certain temperature which is lower than the lower limit value of the maximum ice crystal production zone.

The cooling apparatus 100 stops generation of the electromagnetic field but continues only the cooling after the cooling target object M is cooled to the certain temperature which is lower than the lower limit value of the maximum ice crystal production zone. Therefore, a period of time for the cooling target object M freezing in the maximum ice crystal production zone is reduced and the cooling target object M may be frozen while deterioration of quality of the cooling target object M is reduced.

(4-5)

In the cooling apparatus 100 of this embodiment, the controller 400 starts the cooling operation in a state in which the intensity of the electromagnetic field to be irradiated from the electromagnetic wave irradiation device 300 to the cooling target object M is set to the minimum intensity (in a state in which the output of the electromagnetic wave is the minimum output Smin).

The cooling apparatus 100 starts the subcooling operation, for cooling the cooling target object M in the subcooling state by causing the electromagnetic field to act on the cooling target object M, in a state in which the intensity of the electromagnetic wave is reduced to the minimum intensity. Therefore, the cooling apparatus 100 easily produces the subcooling state of the cooling target object M with high efficiency and less power consumption.

However, the embodiment is not limited to this and the controller 400 may start the cooling operation in a state in which the intensity of the electromagnetic field to be irradiated from the electromagnetic wave irradiation device 300 to the cooling target object M is a value other than the minimum intensity.

(4-6)

The controller 400 of the cooling apparatus 100 of this embodiment increases the cooling capacity of the refrigeration machine 200 and/or reduces the output of the electromagnetic wave to be irradiated from the electromagnetic wave irradiation device 300 to the cooling target object M when the amount of heat of internal heat generation of the cooling target object M generated by the electromagnetic field is determined to be larger than the cooling capacity of the refrigeration machine 200.

In the cooling apparatus 100, the cooling capacity of the refrigeration machine 200 is increased and/or the output of the electromagnetic wave is reduced when the amount of heat of the internal heat generation generated by the electromagnetic wave is larger than the cooling capacity of the refrigeration machine 200. Therefore, the cooling target object M may be cooled without increasing the temperature of the cooling target object M.

(4-7)

In the electromagnetic wave irradiation device 300 of the cooling apparatus 100 of this embodiment, the frequency of the generated electromagnetic field is variable. The controller 400 at least controls the operation of the electromagnetic wave irradiation device 300 to perform the preliminary operation to determine the frequency of the electromagnetic field to be generated in the cooling operation.

In the cooling apparatus 100, the frequency of the electromagnetic field to be generated is not determined in advance for each cooling target object, but the preliminary operation is performed to determine the frequency of the electromagnetic field to be generated using the cooling target object M itself. Therefore, the cooling operation may be performed using the electromagnetic field of the frequency which efficiently causes internal heat generation in the cooling target object M for any type of cooling target object M.

(5) Modifications

Modifications of the foregoing embodiment will be described hereinafter. Note that a part of or whole configurations of each of the various modifications may be combined with a part of or whole configurations of the other modifications as long as contradiction does not occur.

(5-1) Modification A

In the foregoing embodiment, the settable frequency range of the electromagnetic wave irradiation device 300 is included in the regions of a medium wave, a short wave, and an ultrashort wave. However, it is usable, for example, if the settable frequency range of the electromagnetic wave irradiation device 300 includes a frequency which causes the internal heat generation in the cooling target object M and may include regions other than the medium wave, the short wave, and the ultrashort wave.

For example, a frequency (the settable frequency range) of the electromagnetic wave which can be irradiated from the electromagnetic wave irradiation device 300 may include a frequency of at least one of frequency bands including an micro wave (300 MHz to 3 GHz), a centimetric wave (3 to 30 GHz), a millimetric wave (30 to 300 GHz), and a submillimetric wave (300 GHz to 3 THz). More preferably, a frequency of the electromagnetic wave which can be irradiated from the electromagnetic wave irradiation device 300 may include a frequency of at least one of the frequency bands including the micro wave (300 MHz to 3 GHz) and the centimetric wave (3 to 30 GHz). Note that, in a case where the electromagnetic wave irradiation device irradiates the electromagnetic wave of at least one of the frequencies in the micro wave (300 MHz to 3 GHz), the centimetric wave (3 to 30 GHz), the millimetric wave (30 to 300 GHz), and the submillimetric wave (300 GHz to 3 THz), the electromagnetic wave irradiation device may irradiate the cooling target object M with an electromagnetic wave generated in a micro wave generation device (magnetron), such as a microwave oven.

Furthermore, a frequency of the electromagnetic wave which can be irradiated from the electromagnetic wave irradiation device 300 may include frequencies which are out of the frequency bands described above and which realize cooling of the cooling target object M in the subcooling state.

(5-2) Modification B

Although the cooling target object temperature sensor 500 measures a surface temperature of the cooling target object M in the foregoing embodiment, the cooling target object temperature sensor 500 is not limited to this and may measure a temperature of an inner portion of the cooling target object M. For example, the cooling target object temperature sensor 500 may be an optical fiber temperature sensor which measures a temperature of an inner portion of the cooling target object M by inserting an optical fiber probe.

(5-3) Modification C

In the foregoing embodiment, when the temperature of the cooling target object M falls to the second temperature T2, the irradiation with the electromagnetic wave performed by the electromagnetic wave irradiation device 300 is stopped, and thereafter, the normal cooling operation is performed to freeze the cooling target object M, but the present invention is not limited to this. For example, the cooling apparatus 100 may continue the irradiation with the electromagnetic wave performed by the electromagnetic wave irradiation device 300 irrespective of a temperature of the cooling target object M so that the cooling target object M is maintained in the subcooling state.

(5-4) Modification D

In the foregoing embodiment, the output of the electromagnetic wave is controlled by increasing or reducing the output of the electromagnetic wave irradiated from the electromagnetic wave irradiation device 300 by the fixed amount ($\Delta S$) in the subcooling operation, but the present invention is not limited to this.

For example, an amount of the control of the output of the electromagnetic wave in the subcooling operation may not be constant every time. Furthermore, an adjusting amount of the output when the output of the electromagnetic wave is increased in the subcooling operation and the adjusting amount of the output when the output of the electromagnetic wave is reduced in the subcooling operation may be different from each other.

(5-5) Modification E

In the foregoing embodiment, the cooling apparatus 100 is operated such that the normal cooling operation is performed after the preliminary operation, and thereafter, the subcooling operation is performed, but the present invention is not limited to this. For example, the cooling apparatus 100 may execute the subcooling operation immediately after the preliminary operation. However, in terms of energy saving, it is preferable that the electromagnetic wave irradiation device 300 does not irradiate the electromagnetic wave when the temperature of the cooling target object M does not cause the freezing of the cooling target object M.

(5-6) Modification F

In the foregoing embodiment, the refrigeration machine 200 is not operated in the preliminary operation, but the present invention is not limited to this. For example, the preliminary operation may be performed while the refrigeration machine 200 is operated so that quality of the cooling target object M is prevented from being deteriorated due to increase in temperature of the cooling target object M and reduction in temperature of the cooling target object M is realized in a short time.

Note that, in this case, the refrigeration machine 200 is preferably operated in constant cooling capacity in the preliminary operation. The subcooling operation frequency determination unit 410 preferably determines a frequency in which an increase rate in temperature of the cooling target object M is largest at a time of irradiation with the electromagnetic wave in each of various frequencies as the subcooling operation frequency f1. If temperature of the cooling target object M falls at the time of the irradiation with the electromagnetic wave in all of the various frequencies, the subcooling operation frequency determination unit 410 preferably determines a frequency in which a reduction rate in temperature is smallest at the time of the irradiation with the electromagnetic wave in each of the various frequencies as the subcooling operation frequency f1.

(5-7) Modification G

Although the subcooling operation frequency f1 is determined in accordance with the temperature of the cooling target object M in the preliminary operation in the foregoing embodiment, the present invention is not limited to this. For example, the subcooling operation frequency determination unit 410 may monitor a change in temperature of the cooling space 110a when the cooling target object M is irradiated with an electromagnetic wave and determine a frequency of the electromagnetic wave corresponding to the maximum increase in temperature as the subcooling operation frequency f1.

(5-8) Modification H

Although both the preliminary operation and the subcooling operation are performed in the same casing 110 in the foregoing embodiment, the present invention is not limited to this. For example, the preliminary operation may be executed in another casing, and thereafter, the cooling target object M may be transported by a conveyer or the like into the casing 110 from that casing so that the normal cooling operation and the subcooling operation are performed in the casing 110. In this case, the cooling apparatus 100 may include a plurality of electromagnetic wave irradiation devices and a plurality of cooling target object temperature sensors and different electromagnetic wave irradiation devices and different cooling target object temperature sensors may be used in the preliminary operation and the subcooling operation.

Note that the cooling apparatus 100, for example, may include a plurality of electromagnetic wave irradiation devices and use different electromagnetic irradiation devices in the preliminary operation and the subcooling operation, even when the preliminary operation and the subcooling operation are performed in the same casing 110.

(5-9) Modification I

Although the electromagnetic wave irradiation device 300 of the foregoing embodiment performs the irradiation with the electromagnetic wave of frequencies within the settable frequency range using a single high frequency power source 320, the present invention is not limited to this. For example, the electromagnetic wave irradiation device 300 may include a plurality of high frequency power sources 320 and use the different high frequency power source according to the frequency of the irradiated electromagnetic wave.

(5-10) Modification J

The controller 400 of the foregoing embodiment may not be an independent device. For example, the refrigeration machine controller 290 of the refrigeration machine 200 may perform control similarly to the controller 400.

(5-11) Modification K

Although the electromagnetic wave output/freezing capacity controller 420 increases the freezing capacity of the refrigeration machine 200 or reduces the output S of the electromagnetic wave when it is determined that the heat amount of internal heat generation of the cooling target object M caused by irradiation with the electromagnetic wave is larger than the cooling capacity of the refrigeration machine 200 in the foregoing embodiment, the present invention is not limited to this.

For example, the electromagnetic wave output/freezing capacity controller 420 may increase the freezing capacity of the refrigeration machine 200 or reduce the output S of the electromagnetic wave when it is determined that the heat amount of internal heat generation of the cooling target object M caused by irradiation with the electromagnetic wave is relatively large compared to the cooling capacity of the refrigeration machine 200. Specifically, the electromagnetic wave output/freezing capacity controller 420 may also increase the freezing capacity of the refrigeration machine 200 or reduce the output S of the electromagnetic wave when the temperature reduction rate of the cooling target object M is lower than a predetermined value.

(5-12) Modification L

In the foregoing embodiment, the frequency of the electromagnetic wave irradiated from the electromagnetic wave irradiation device 300 is variable. Although the frequency of the electromagnetic wave to be irradiated from the electromagnetic wave irradiation device 300 is preferably variable, the frequency of the electromagnetic wave irradiated from the electromagnetic wave irradiation device 300 may not be variable.

Second Embodiment

As with the cooling apparatus 100 of the first embodiment, a cooling apparatus 1100 of a second embodiment of the present invention also cools the cooling target object M, such as food. The cooling apparatus 1100 is capable of cooling the cooling target object M in a subcooling zone by cooling the cooling target object M while an electric field (an electrostatic field) acts on the cooling target object M.

The cooling apparatus 1100 includes an electric field generation device 1300 instead of the electromagnetic wave irradiation device 300. Furthermore, the cooling apparatus 1100 uses an electric field instead of an electromagnetic field, and therefore, control performed by a controller 1400 which is an example of a control unit is partially different.

The cooling apparatus 1100 and the cooling apparatus 100 have many common points, and therefore, different points are mainly described herein.

The cooling apparatus 1100 mainly includes the casing 110, the refrigeration machine 200, the electric field generation device 1300, the controller 1400, the cooling target object temperature sensor 500, and the casing temperature sensor 600 (refer to FIGS. 1 and 2). The casing 110, the refrigeration machine 200, the cooling target object temperature sensor 500, and the casing temperature sensor 600 are the same as those of the first embodiment, and therefore, descriptions thereof are omitted.

The electric field generation device 1300 is an example of a generator which generates an electric field (an electrostatic field) which acts on the cooling target object M. The refrigeration machine 200 cools the cooling target object M while the electric field generation device 1300 causes an electric field act on the cooling target object M so that the cooling target object M may be cooled in the subcooling zone.

Unlike the electromagnetic wave irradiation device 300, the electric field generation device 1300 includes a direct current power source 1320 instead of the high frequency power source 320. In the electric field generation device 1300, intensity of a generated electric field (an output of the high frequency power source 320) is variable. The electric field generation device 1300 may change the intensity of the electric field within a predetermined range.

The controller 1400 is electrically connected to the refrigeration machine controller 290 and the direct current power source 1320 and controls operations of the refrigeration machine 200 and the electric field generation device 1300. The controller 1400 causes the cooling apparatus 1100 to perform two types of operation (including a normal cooling operation and a subcooling operation) by controlling the operations of the refrigeration machine 200 and the electric field generation device 1300. Unlike the cooling apparatus 100, the cooling apparatus 1100 does not perform the preliminary operation since a process of determining a frequency is not required.

In the normal cooling operation, the refrigeration machine 200 is operated to cool the cooling target object M in a state in which the electric field generation device 1300 is stopped.

The subcooling operation is an example of the cooling operation. In the subcooling operation, the controller 1400 controls the operations of the refrigeration machine 200 and the electric field generation device 1300 such that the refrigeration machine 200 cools the cooling target object M in a state in which the electric field generation device 1300 generates the electric field.

The controller 1400 controls intensity of the electric field generated by the electric field generation device 1300 in accordance with the temperature of the cooling target object M which is measured by the cooling target object temperature sensor 500 in the subcooling operation.

Operation of the cooling apparatus 1100 will be described hereinafter.

Figure 8:
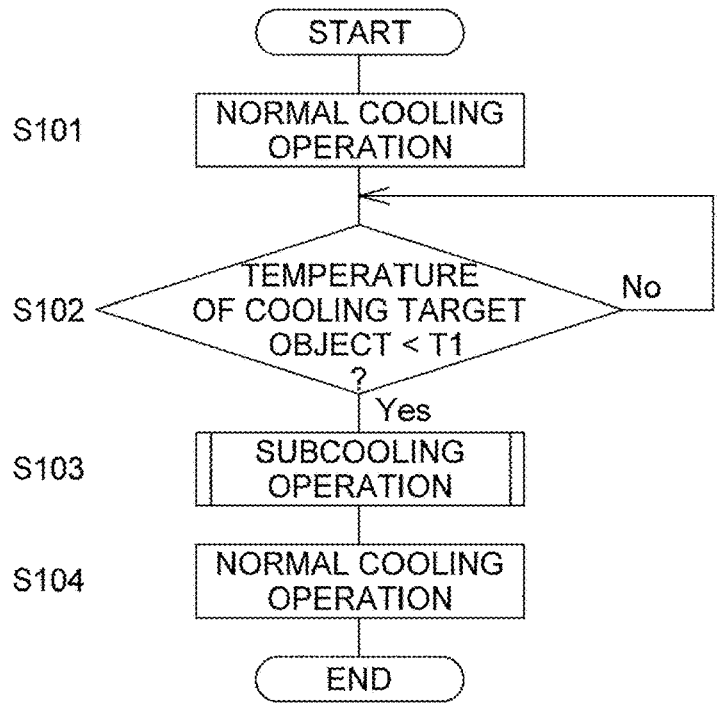
FIG. 8 is an example of a flowchart of a cooling process of a cooling target object performed by the cooling apparatus of FIG. 7.

When an operation start switch (not illustrated) of the cooling apparatus 1100 is pressed, the controller 1400 causes the cooling apparatus 1100 to execute various operations in accordance with a flowchart of FIG. 8. The flowchart of FIG. 8 is the same as that of the cooling process performed by the cooling apparatus 100 of the first embodiment except that a preliminary operation is not performed, and therefore, a description of the process in FIG. 8 is omitted.

Next, the subcooling operation performed by the cooling apparatus 1100 will be described.

Figure 9:
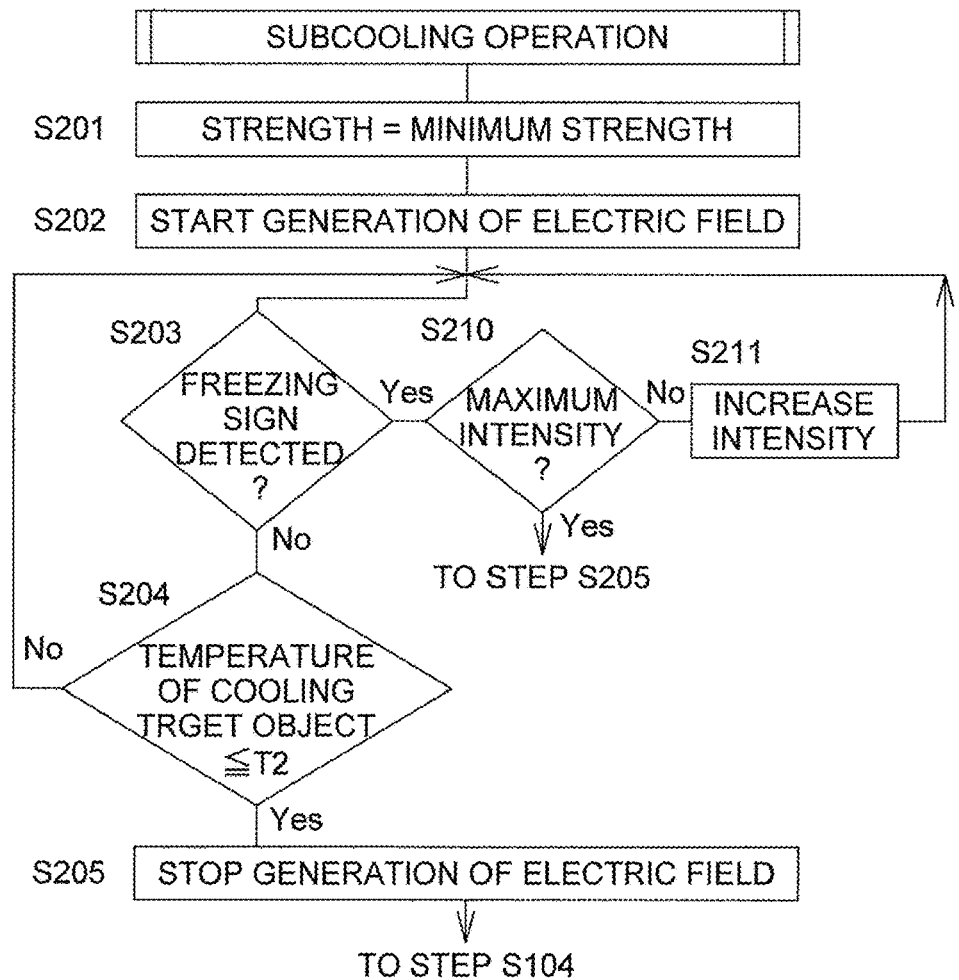
FIG. 9 is an example of a flowchart of an operation of the cooling apparatus of FIG. 7 in a subcooling operation in the cooling process.

The subcooling operation of the cooling apparatus 1100 is controlled by the controller 1400 in accordance with a flowchart of FIG. 9, for example.

Note that it is assumed that the refrigeration machine 200 operates with predetermined cooling capacity when the subcooling operation is started. Furthermore, although not described hereinafter, the controller 1400 appropriately obtains the temperature of the cooling target object M detected by the cooling target object temperature sensor 500 in the subcooling operation.

First, the controller 1400 sets the lower limit value (the minimum intensity) of the settable range as the intensity of the electromagnetic field generated by the electric field generation device 1300 (step S201). Then, the controller 1400 controls the operation of the electric field generation device 1300 so as to start generation of the electric field (step S202).

Thereafter, the controller 1400 detects a sign indicating that the cooling target object M is to enter a frozen state in accordance with a change rate of the temperature detected by the cooling target object temperature sensor 500 in the subcooling operation (step S203). The process in step S203 is the same as that of step S24 in the flowchart of FIG. 5 according to the first embodiment, and therefore, a description thereof is omitted.

When the sign indicating that the cooling target object M is to enter the frozen state is not detected in step S203, the process proceeds to step S204. When the sign indicating that the cooling target object M is to enter the frozen state is detected in step S203, the process proceeds to step S210.

In step S204, the controller 1400 determines whether the temperature of the cooling target object M detected by the cooling target object temperature sensor 500 is equal to or lower than a predetermined second temperature T2. The second temperature T2 is a predetermined value lower than the lower limit value (−5° C.) of the maximum ice crystal production zone. When it is determined that the temperature of the cooling target object M detected by the cooling target object temperature sensor 500 is equal to or lower than the second temperature T2 in step S204, the process proceeds to step S205. When it is determined that the temperature of the cooling target object M detected by the cooling target object temperature sensor 500 is higher than the second temperature T2 in step S204, the process returns to step S203.

In step S205, generation of the electric field performed by the electric field generation device 1300 is stopped while the cooling performed by the refrigeration machine 200 is maintained (the operation of the refrigeration machine 200 is continued), and the process proceeds to step S104 in FIG. 8. In other words, the controller 1400 stops the generation of the electric field performed by the electric field generation device 1300 while the cooling performed by the refrigeration machine 200 is maintained, after the cooling target object M is cooled such that the temperature of the cooling target object M detected by the cooling target object temperature sensor 500 is lowered to the second temperature T2. Note that the controller 1400 preferably controls the refrigeration machine 200 so that cooling capacity is increased (to the maximum cooling capacity, for example) when the process proceeds from step S205 to step S104.

A case where the process proceeds from step S203 to step S210 (that is, a case where the controller 1400 detects, in the subcooling operation, the sign indicating that the cooling target object M is to enter the frozen state in accordance with the change rate of the temperature of the cooling target object M detected by the cooling target object temperature sensor 500) will now be described.

In step S210, the controller 1400 determines whether the intensity of the electric field generated by the electric field generation device 1300 is the upper limit value (the maximum intensity) of the settable range.

The controller 1400 tends to maintain the subcooling state of the cooling target object M by increasing the intensity of the electric field generated by the electric field generation device 1300 as shown in step S211 described below when detecting the sign indicating that the cooling target object M is to enter the frozen state. In contrast, when the maximum intensity has been set as the intensity of the electric field, the process proceeds to step S205 such that the controller 1400 changes the subcooling operation to the normal cooling operation since it is difficult to maintain the subcooling state of the cooling target object M (it is difficult to increase the intensity of the electric field). On the other hand, when the controller 1400 determines that the intensity of the electric wave is not the maximum intensity in step S210, the process proceeds to step S211.

In step S211, the controller 1400 increases the intensity of the electric field irradiated from the electric field generation device 1300 to the cooling target object M by a predetermined amount. Thereafter, the process proceeds to step S203.

Note that, as with the process from step S40 to step S42 in the flowchart of FIG. 5 of the cooling apparatus 100, in the cooling apparatus 1100, control of increasing the cooling capacity of the refrigeration machine 200 or control of reducing the intensity of the electric field may also be performed when the temperature of the cooling target object M tends to be increased.

The cooling apparatus 1100 according to the second embodiment has the same characteristics as characteristics (4-1) to (4-5) described as the characteristics of the cooling apparatus 100 of the first embodiment although the electric field is generated instead of the electromagnetic field.

Furthermore, the modifications of the first embodiment may be applied to the cooling apparatus 100 of the second embodiment as long as consistency is maintained.

INDUSTRIAL APPLICABILITY

The present invention is widely adaptable to cooling apparatuses which cool a cooling target object in a subcooling zone by applying an electromagnetic field or an electric field on the cooling target object.

REFERENCE SIGNS LIST 100, 1100 Cooling Apparatus
200 Refrigeration Machine
300 Electromagnetic Wave Irradiation Device (Generator)
400 Controller
500 Temperature Sensor
1300 Electric Field Generation Device (Generator)
M Cooling Target Object
S Output of Electromagnetic Wave (Intensity of Electromagnetic Field)
Smin Minimum Output of Electromagnetic Wave (Minimum Intensity of Electromagnetic Field)

CITATION LIST

Patent Literature

PTL 1: Japanese Unexamined Patent Application Publication No. 2001-245645

The invention claimed is:
1. A cooling apparatus, comprising:
  a refrigeration machine configured to cool a cooling target object (M);
  a generator configured to generate an electromagnetic field or an electric field which acts on the cooling target object, intensity of the electromagnetic field and the electric field being variable;
  a controller configured to control operations of the refrigeration machine and the generator and perform a cooling operation of cooling the cooling target object by using the refrigeration machine in a state in which the electromagnetic field or the electric field is generated, the controller configured to detect a sign indicating that the cooling target object is to enter a frozen state in the cooling operation; and
  a temperature sensor configured to measure a temperature of the cooling target object, wherein
  the controller is configured to control the intensity of the electromagnetic field or the electric field generated by the generator in accordance with the temperature measured by the temperature sensor in the cooling operation, and in the cooling operation, the controller is configured to detect the sign indicating that the cooling target object is to enter the frozen state in accordance with a change rate of the temperature of the cooling target object, and to increase the intensity when the sign is detected.

2. The cooling apparatus according to claim 1, wherein
in the cooling operation, the controller is configured to stop generation of the electromagnetic field or the electric field by the generator while continuing cooling by the refrigeration machine after the cooling target object is cooled such that the temperature detected by the temperature sensor is lowered to a certain temperature which is lower than a lower limit value of a maximum ice crystal production zone.

3. The cooling apparatus according to claim 1, wherein
the controller is configured to start the cooling operation in a state in which the intensity of the electromagnetic field or the electric field generated by the generator is set to a minimum intensity.

4. The cooling apparatus according to claim 1, wherein
the generator is configured to generate the electromagnetic field, and the controller is configured to increase cooling capacity of the refrigeration machine and/or to reduce the intensity of the electromagnetic field generated by the generator when an amount of internal heat generation of the cooling target object generated by the electromagnetic field is determined to be larger than the cooling capacity of the refrigeration machine.

5. The cooling apparatus according to claim 1, wherein
the generator is configured to generate the electromagnetic field, a frequency of the electromagnetic field generated by the generator is variable, and the controller is configured to at least control the operation of the generator to perform a preliminary operation to determine a frequency of the electromagnetic field to be generated in the cooling operation.

\* \* \* \* \*